(12) United States Patent
Mori et al.

(10) Patent No.: US 9,935,575 B2
(45) Date of Patent: Apr. 3, 2018

(54) POWER CONVERSION DEVICE AND CONTROL METHOD FOR SAME, AND ELECTRIC POWER STEERING CONTROL DEVICE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/503,744

(22) PCT Filed: Oct. 8, 2014

(86) PCT No.: PCT/JP2014/076936
§ 371 (c)(1),
(2) Date: Feb. 14, 2017

(87) PCT Pub. No.: WO2016/056083
PCT Pub. Date: Apr. 14, 2016

(65) Prior Publication Data
US 2017/0272019 A1    Sep. 21, 2017

(51) Int. Cl.
*H02P 21/00* (2016.01)
*H02P 21/22* (2016.01)
(Continued)

(52) U.S. Cl.
CPC ............ *H02P 21/22* (2016.02); *B62D 5/0463* (2013.01); *H02M 7/5395* (2013.01); *H02P 21/14* (2013.01);
(Continued)

(58) Field of Classification Search
CPC ...... H02P 21/22; H02P 25/22; H02P 2207/05; H02P 6/085; H02P 6/182; H02M 2001/0009; H02M 7/5395
(Continued)

(56) References Cited

U.S. PATENT DOCUMENTS 6,984,948 B2 * 1/2006 Nakata .................. H02P 21/00
                                                        318/400.02
8,102,141 B2 * 1/2012 Nagai ..................... H02P 1/426
                                                        318/727
(Continued)

FOREIGN PATENT DOCUMENTS

JP    2011-015472 A    1/2011
JP    2011-166904 A    8/2011
(Continued)

OTHER PUBLICATIONS

International Search Report for application No. PCT/JP2014/076936 dated Nov. 4, 2014.

*Primary Examiner* — Bentsu Ro
*Assistant Examiner* — Thai Dinh
(74) *Attorney, Agent, or Firm* — Sughrue Mion, PLLC; Richard C. Turner

(57) ABSTRACT

Provided are a power conversion device, relating to control of detecting a bus current in operation, and capable of acquiring an average current through a small amount of calculation and being implemented by an inexpensive microcomputer. A variation in a winding current flowing through a multi-phase winding of an AC rotating machine, namely, a phase current, is small at a timing at which voltage vectors on both sides of an axis having a larger inductance out of d and q axes of the AC rotating machine are output. Thus, switching signals are generated at timings at which the voltage vectors on both sides of the axis having the larger inductance out of the d and q axes are output, and the bus current is detected in accordance with the switching signals, (Continued)

thereby acquiring a value close to an average of the winding current.

20 Claims, 24 Drawing Sheets

(51) Int. Cl.
    *H02P 21/14*     (2016.01)
    *H02P 27/08*     (2006.01)
    *H02M 7/5395*     (2006.01)
    *B62D 5/04*     (2006.01)
    *H02M 1/00*     (2006.01)

(52) U.S. Cl.
    CPC ..... *H02P 27/08* (2013.01); *H02M 2001/0009* (2013.01)

(58) Field of Classification Search
    USPC ......... 318/400.02, 599, 400.22, 400.26, 722, 318/254.1, 376, 437
    See application file for complete search history.

(56) References Cited

U.S. PATENT DOCUMENTS

| | | | |
|---|---|---|---|
| 8,159,163 B2* | 4/2012 | Akiyama | H02P 21/14 318/400.04 |
| 8,339,084 B2* | 12/2012 | Welchko | H02P 29/0241 318/438 |
| 8,541,971 B2* | 9/2013 | Sakai | H02P 9/009 318/400.02 |
| 2013/0314013 A1 | 11/2013 | Ajima et al. | |

FOREIGN PATENT DOCUMENTS

| | | |
|---|---|---|
| JP | 2012-228155 A | 11/2012 |
| JP | 2013-062913 A | 4/2013 |
| JP | 2013-247754 A | 12/2013 |

* cited by examiner

FIG. 2

| Qup | Qun | Qvp | Qvn | Qwp | Qwn | VOLTAGE VECTOR | BUS CURRENT Idc |
|---|---|---|---|---|---|---|---|
| 0 | 1 | 0 | 1 | 0 | 1 | V0 | 0 |
| 1 | 0 | 0 | 1 | 0 | 1 | V1 | Iu |
| 1 | 0 | 1 | 0 | 0 | 1 | V2 | -Iw |
| 0 | 1 | 1 | 0 | 0 | 1 | V3 | Iv |
| 0 | 1 | 1 | 0 | 1 | 0 | V4 | -Iu |
| 0 | 1 | 0 | 1 | 1 | 0 | V5 | Iw |
| 1 | 0 | 0 | 1 | 1 | 0 | V6 | -Iv |
| 1 | 0 | 1 | 0 | 1 | 0 | V7 | 0 |

FIG.11

| θ [DEGREE] | 270~330 | 330~0, 0~30 | 30~90 | 90~150 | 150~210 | 210~270 |
|---|---|---|---|---|---|---|
| q AXIS PHASE θq [DEGREE] | 0~60 | 60~120 | 120~180 | 180~240 | 240~300 | 300~360 |
| TWO VOLTAGE VECTORS UPON BUS CURRENT DETECTION | V1、V2 | V3、V2 | V3、V4 | V5、V4 | V5、V6 | V1、V6 |

FIG.16

| θ [DEGREE] | 270~330 | 330~0, 0~30 | 30~90 | 90~150 | 150~210 | 210~270 |
|---|---|---|---|---|---|---|
| q AXIS PHASE θq [DEGREE] | 0~60 | 60~120 | 120~180 | 180~240 | 240~300 | 300~360 |
| TWO VOLTAGE VECTORS UPON BUS CURRENT DETECTION | V5、V4 | V5、V6 | V1、V6 | V1、V2 | V3、V2 | V3、V4 |

FIG.21

| θv [DEGREE] | 0~60 | 60~120 | 120~180 | 180~240 | 240~300 | 300~360 |
|---|---|---|---|---|---|---|
| VOLTAGE MAGNITUDE RELATIONSHIP | Vu≧Vv≧Vw | Vv≧Vu≧Vw | Vv≧Vw≧Vu | Vw≧Vv≧Vu | Vw≧Vu≧Vv | Vu≧Vw≧Vv |
| TWO VOLTAGE VECTORS UPON BUS CURRENT DETECTION | V1、V2 | V3、V2 | V3、V4 | V5、V4 | V5、V6 | V1、V6 |

FIG.24

| Qup 1 | Qun 1 | Qvp 1 | Qvn 1 | Qwp 1 | Qwn 1 | FIRST VOLTAGE VECTOR | FIRST BUS CURRENT Idc 1 |
|---|---|---|---|---|---|---|---|
| 0 | 1 | 0 | 1 | 0 | 1 | V0(1) | 0 |
| 1 | 0 | 0 | 1 | 0 | 1 | V1(1) | Iu1 |
| 1 | 0 | 1 | 0 | 0 | 1 | V2(1) | -Iw1 |
| 0 | 1 | 1 | 0 | 0 | 1 | V3(1) | Iv1 |
| 0 | 1 | 1 | 0 | 1 | 0 | V4(1) | -Iu1 |
| 0 | 1 | 0 | 1 | 1 | 0 | V5(1) | Iw1 |
| 1 | 0 | 0 | 1 | 1 | 0 | V6(1) | -Iv1 |
| 1 | 0 | 1 | 0 | 1 | 0 | V7(1) | 0 |

FIG.25

| Qup 2 | Qun 2 | Qvp 2 | Qvn 2 | Qwp 2 | Qwn 2 | SECOND VOLTAGE VECTOR | SECOND BUS CURRENT Idc 2 |
|---|---|---|---|---|---|---|---|
| 0 | 1 | 0 | 1 | 0 | 1 | V0(2) | 0 |
| 1 | 0 | 0 | 1 | 0 | 1 | V1(2) | Iu2 |
| 1 | 0 | 1 | 0 | 0 | 1 | V2(2) | -Iw2 |
| 0 | 1 | 1 | 0 | 0 | 1 | V3(2) | Iv2 |
| 0 | 1 | 1 | 0 | 1 | 0 | V4(2) | -Iu2 |
| 0 | 1 | 0 | 1 | 1 | 0 | V5(2) | Iw2 |
| 1 | 0 | 0 | 1 | 1 | 0 | V6(2) | -Iv2 |
| 1 | 0 | 1 | 0 | 1 | 0 | V7(2) | 0 |

FIG.30

| θ [DEGREE] | 270~300 | 300~330 | 330~360 | 0~30 | 30~60 | 60~90 |
|---|---|---|---|---|---|---|
| q AXIS PHASE θq [DEGREE] | 0~30 | 30~60 | 60~90 | 90~120 | 120~150 | 150~180 |
| TWO FIRST VOLTAGE VECTORS UPON BUS CURRENT DETECTION | V1(1), V2(1) | V1(1), V2(1) | V3(1), V2(1) | V3(1), V2(1) | V3(1), V4(1) | V3(1), V4(1) |
| TWO SECOND VOLTAGE VECTORS UPON BUS CURRENT DETECTION | V6(2), V1(2) | V1(2), V2(2) | V1(2), V2(2) | V3(2), V2(2) | V3(2), V2(2) | V3(2), V4(2) |

| θ [DEGREE] | 90~120 | 120~150 | 150~180 | 180~210 | 210~240 | 240~270 |
|---|---|---|---|---|---|---|
| q AXIS PHASE θq [DEGREE] | 180~210 | 210~240 | 240~270 | 270~300 | 300~330 | 330~360 |
| TWO FIRST VOLTAGE VECTORS UPON BUS CURRENT DETECTION | V5(1), V4(1) | V5(1), V4(1) | V5(1), V6(1) | V5(1), V6(1) | V1(1), V6(1) | V1(1), V6(1) |
| TWO SECOND VOLTAGE VECTORS UPON BUS CURRENT DETECTION | V3(2), V4(2) | V5(2), V4(2) | V5(2), V4(2) | V5(2), V6(2) | V5(2), V6(2) | V6(2), V1(2) |

POWER CONVERSION DEVICE AND CONTROL METHOD FOR SAME, AND ELECTRIC POWER STEERING CONTROL DEVICE

CROSS REFERENCE TO RELATED APPLICATIONS

This Application is a National Stage of International Application No. PCT/JP2014/076936, filed on Oct. 8, 2014, the contents of all of which are incorporated herein by reference in its entirety.

TECHNICAL FIELD

The present invention relates to a power conversion device, and the like, and more particularly, to detection of a bus current during operation.

BACKGROUND ART

For example, in a related-art motor control device and a related-art electric power steering device disclosed in Patent Literature 1, the motor control device is configured to perform drive control of a motor based on duty command values for respective PWM phases, and to detect a motor current in each phase of the motor with a one-shunt type current detector. The motor control device includes a current detection correction part for calculating a current detection correction value based on a power supply voltage of an inverter, the duty command values for the respective phases, counter electromotive voltage information on the motor, the motor currents in the respective phases detected by the current detector, arrangement information on the PWM, and an electrical characteristic equation of the motor. The current detection correction value is used to correct the motor currents in the respective phases detected by the current detector so as to acquire a motor average current, thereby performing drive control of the motor.

CITATION LIST

Patent Literature

[PTL 1] JP 2013-62913 A

SUMMARY OF INVENTION

Technical Problem

In the above-mentioned motor control device and electric power steering device, for the correction to acquire the average current, the current detection correction part is configured to calculate the current detection correction value based on the power supply voltage of the inverter, the duty command values for the respective phases, the counter electromotive voltage information on the motor, the motor currents in the respective phases detected by the current detector, the arrangement information on the PWM, and the electrical characteristic equation of the motor, and thus the calculation of the correction value requires a large amount of calculation, resulting in such a problem that implementation by using an inexpensive microcomputer is difficult. Further, temperature fluctuation of the motor causes fluctuation in the flux interlinkage number, which is proportional to a resistance R and a counter electromotive voltage EMF of the motor. Moreover, an inductance L of the motor fluctuates due to influence of magnetic saturation when a current is supplied to a winding of the motor. When the motor constants fluctuate in this way, and errors occur between the motor constants and motor constants stored in the current detection correction part, and an error occurs between a difference between the motor current in each phase detected by the current detector and the motor average current and the current detection correction value, resulting in such a problem that the motor currents in the respective phases detected by the current detector cannot be corrected to acquire the motor average current. Moreover, even when such a countermeasure that correction reflecting the variations in the motor constants is made in the current detection correction part is taken, there arises such a new problem that the countermeasure requires further calculation.

The present invention has been made in view of the above-mentioned problems. It is an object of the present invention to provide a power conversion device, and the like, relating to the control of detecting a bus current in operation, and capable of acquiring an average current through a small amount of calculation and being implemented by an inexpensive microcomputer.

Solution to Problem

According to one embodiment of the present invention, there are provided a power conversion device, and the like, including: an AC rotating machine having saliency, and including a multi-phase winding of three phases or more; a DC power supply configured to output a DC voltage; a voltage command calculation part configured to calculate voltage commands based on a control command from an outside for the AC rotating machine; a switching signal generation part configured to output switching signals corresponding to at least two voltage vectors on both sides of an axis having a larger inductance out of d and q axes of the AC rotating machine, and corresponding to the voltage commands; a power conversion part configured to carry out, based on the switching signals, one or both of an operation of converting the DC voltage from the DC power supply to an AC voltage and supplying the AC voltage to the AC rotating machine during a power running operation, and an operation of converting an electromotive force of the AC rotating machine to DC power and supplying the DC power to the DC power supply during a regeneration operation; a current detection part configured to detect a bus current, which is a current flowing between the DC power supply and the power conversion part; and a phase current calculation part configured to calculate, based on the detected bus current, a phase current flowing through the multi-phase winding of the AC rotating machine, in which the current detection part is configured to detect the bus current when the switching signals corresponding to the at least two voltage vectors are output.

Advantageous Effects of Invention

According to the present invention, it is possible to provide the power conversion device, and the like, relating to the control of detecting the bus current in operation, and capable of acquiring the average current through a small amount of calculation and being implemented by an inexpensive microcomputer.

BRIEF DESCRIPTION OF DRAWINGS

FIG. 2 is a table for showing an example of a relationship among switching signals, voltage vectors, and currents flowing through a three-phase winding in the power conversion device according to the first embodiment of the present invention.

FIG. 11 is a table for showing an example of a relationship among a rotational position $\theta$ of the AC rotating machine, a q axis phase $\theta q$, and two voltage vectors upon the bus current detection in the power conversion device according to the first embodiment of the present invention.

FIG. 16 is a table for showing an example of a relationship among the rotational position $\theta$ of the AC rotating machine, the q axis phase $\theta q$, and the two voltage vectors upon the bus current detection when the phase angle $\theta \beta$ of the current vector is 180 degrees in the power conversion device according to the first embodiment of the present invention.

FIG. 21 is a table for showing an example of a relationship among a voltage phase $\theta v$, a voltage magnitude relationship, and the two voltage vectors upon the bus current detection when an amplitude Vmap of voltage commands Vu, Vv, and Vw is more than a threshold in the power conversion device according to the first embodiment of the present invention.

FIG. 24 is a table for showing an example of a relationship among switching signals, a voltage vector, and a current flowing through the three-phase winding on a first three-phase winding C1 side in the power conversion device according to the second embodiment of the present invention.

FIG. 25 is a table for showing an example of a relationship among switching signals, a voltage vector, and a current flowing through the three-phase winding on a second three-phase winding C2 side in the power conversion device according to the second embodiment of the present invention.

FIG. 30 is a table for showing an example of a relationship among the rotational position θ of the AC rotating machine, the q axis phase θq, and two first voltage vectors and two second voltage vectors upon the bus current detection in the power conversion device according to the second embodiment of the present invention.

DESCRIPTION OF EMBODIMENTS

Figure 1:
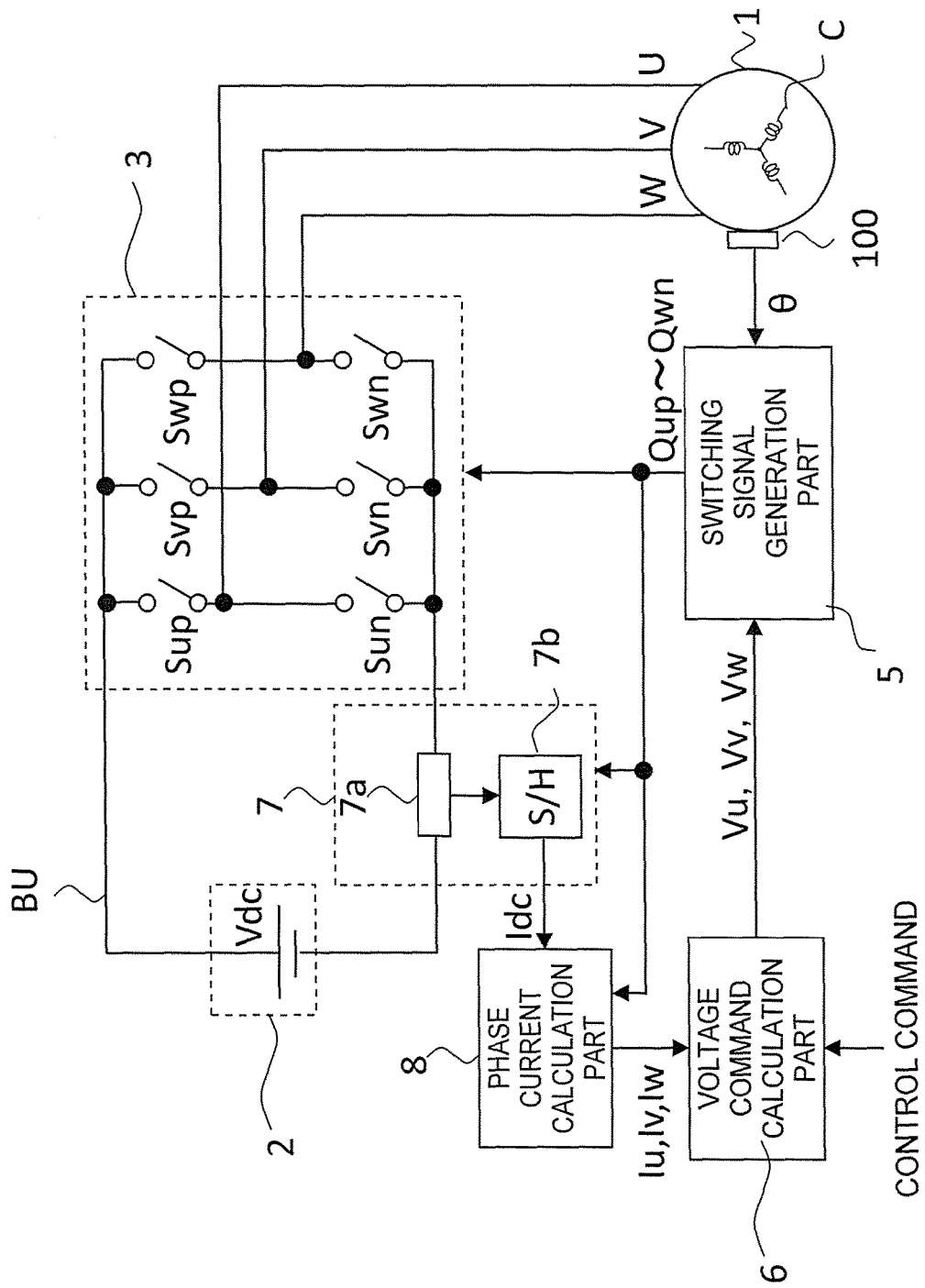
FIG. 1 is a diagram for illustrating an overall configuration of a power conversion device according to a first embodiment of the present invention.

A power conversion device, and the like, according to the present invention relate to control of detecting a bus current in operation, and fluctuation in a winding current flowing through a multi-phase winding of an AC rotating machine is small at a timing at which voltage vectors on both sides of an axis larger in an inductance of the AC rotating machine are output. A value close to an average of the winding current can be acquired by detecting the bus current at this timing. Thus, according to the present invention, a large amount of calculation, e.g., calculation of a current detection correction value based on a power supply voltage of an inverter, duty command values for respective phases, counter electromotive voltage information on a motor, motor currents in the respective phase detected by a current detector, arrangement information on PWM, and an electrical characteristic equation of the motor is not necessary unlike a current detection correction part of the related art, and only a small amount of calculation is required for implementation. In this manner, application of an inexpensive microcomputer is facilitated. Further, the value close to the average of winding currents can be acquired while influence on variations in constants of the rotating machine is suppressed.

A description is now given of respective embodiments of the power conversion device, and the like, according to the present invention referring to the drawings. In the respective embodiments, the same or corresponding components are denoted by the same numerals, and a redundant description thereof is not given.

First Embodiment

FIG. 1 is a diagram for illustrating an overall configuration of a power conversion device according to a first embodiment of the present invention. An AC rotating machine 1 is constructed by a permanent magnet synchronous rotating machine including a three-phase winding (generally, multi-phase winding) C having three phases U, V, and W.

A DC power supply 2 is configured to output a DC voltage Vdc to a power conversion part 3. This DC power supply 2 may include all devices that are configured to output a DC voltage, e.g., a battery, a DC-DC converter, a diode rectifier, and a PWM rectifier (which are not shown).

The power conversion part 3 is configured to turn on/off semiconductor switches Sup to Swn based on switching signals Qup to Qwn, thereby applying power conversion to the DC voltage Vdc input from the DC power supply 2, and applying AC voltages on a three-phase winding C having U, V and W phases of the AC rotating machine 1. As each of the semiconductor switches Sup to Swn, a semiconductor switching device, e.g., an IGBT, a bipolar transistor, or a MOS power transistor and a diode connected to each other in an anti-parallel connection state are used. On this occasion, the switching signals Qup, Qun, Qvp, Qvn, Qwp, and Qwn are switching signals for respectively turning on/off the semiconductor switches Sup, Sun, Svp, Svn, Swp, and Swn in the power conversion part 3.

A switching signal generation part 5 is configured to output the switching signals Qup to Qwn to which the pulse width modulation (PWM modulation) is applied in accordance with the voltage commands Vu, Vv, and Vw output from a voltage command calculation part 6. The switching signals Qup to Qwn have pulse widths in accordance with the voltage commands Vu, Vv, and Vw.

On this occasion, according to the present invention, the voltage conversion part 3 is configured to use the switching signals Qup to Qwn to carry out: an operation of converting the DC voltage from the DC power supply 2 to an AC voltage, and supplying the AC voltage to the AC rotating machine 1 during a power running operation; an operation of converting an electromotive force of the AC rotating machine 1 to DC power, and supplying the DC power to the DC power supply 2 during a regeneration operation; and both of the operation during the power running operation and the operation during the regeneration operation.

According to the present invention, the switching signals Qup to Qwn are output to the power conversion part 3 as well as a current detection part 7 and a phase current calculation part 8 for the current detection, and the current detection part 7 and the phase current calculation part 8 are configured to respectively carry out the detection and the calculation in accordance with the switching signals Qup to Qwn. All the switching signals Qup to Qwn do not need to be output to the current detection part 7 and the phase current calculation part 8, and the same effect can be provided by using, for example, upper switching signals Qup, Qvp and Qwp or using another state variable that can represent states of the switching signals Qup to Qwn.

The voltage command calculation part 6 is configured to calculate the voltage commands Vu, Vv, and Vw for driving the AC rotating machine 1, and output the voltage commands Vu, Vv, and Vw to the switching signal generation part 5. As a calculation method for the voltage commands Vu, Vv, and Vw, for example, there is given V/F control of setting a speed (frequency) command f for the AC rotating machine 1 as the control command of FIG. 1 to determine the amplitude of the voltage commands. Moreover, there is used current feedback control of setting a current command for the AC rotating machine 1 as the control command, and calculating the voltage commands Vu, Vv, and Vw so that, based on deviations between the set control command (=current command) and the currents (phase currents) Iu, Iv, and Iw output by the phase current calculation part 8 described later and flowing through the three-phase winding, the deviations are zero by means of the proportional-integral control.

The V/F control is feedforward control, and does not require the three-phase currents Iu, Iv, and Iw. Thus, the input of the three-phase currents Iu, Iv, and Iw to the voltage command calculation part 6 is not essential in this case.

The current detection part 7 is configured to detect a bus current Idc, which is a current flowing between the DC power supply 2 and the power conversion part 3, and output a detection result to the phase current calculation part 8. The current detection part 7 is constructed by a shunt resistor 7a and a sample-and-hold device 7b configured to sample and hold the current flowing through the shunt resistor 7a, thereby detecting the bus current Idc. A current transformer (CT) may be used in place of the shunt resistor 7a, and in this case, an output voltage of the current transformer is sampled and held by the sample-and-hold device 7b, thereby detecting the bus current Idc.

A description is now given of a relationship between voltage vectors based on the switching signals Qup to Qwn, the bus current Idc, and the currents Iu, Iv, and Iw flowing through the three-phase winding. In FIG. 2, the relationship among the switching signals Qup to Qwn, the voltage vectors, the bus current, and the currents Iu, Iv, and Iw flowing through the three-phase winding is illustrated. In FIG. 2, when the value of one of Qup to Qwn is 1, one of the semiconductor switches Sup to Swn corresponding to the one of Qup to Qwn having the value of 1 is on. When the value of one of Qup to Qwn is 0, one of the semiconductor switches Sup to Swn corresponding to the one of Qup to Qwn having the value of 0 is off.

Figure 3:
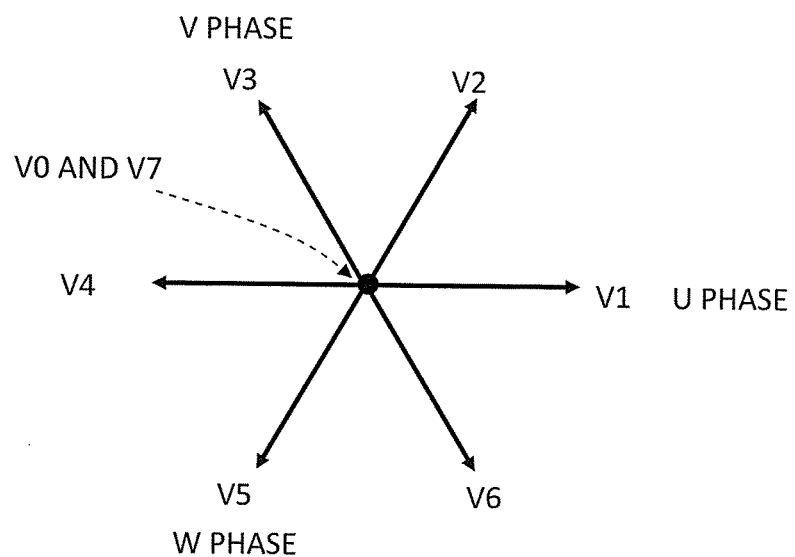
FIG. 3 is a diagram for illustrating a relationship between the voltage vectors and phase directions of the three-phase winding of an AC rotating machine according to the present invention.

The voltage vectors are illustrated in FIG. 3. V1 to V6 are vectors different in the phase by 60 degrees from each other. V1, V3, and V5 have U, V, W phase directions of the three-phase winding, respectively. Moreover, V0 and V7 are voltage vectors having the magnitude of zero.

The phase current calculation part 8 is configured to output Iu, Iv, and Iw from the relationship shown in FIG. 2 based on the bus current Idc and the switching signals Qup to Qwn. V0 and V7 cannot be used to detect the three-phase currents based on the bus current. Thus, for example, the voltage vector V1 is output to detect Iu, and the voltage vector V2 is output to detect -Iw. There may be provided such a configuration that, based on the fact that a sum of the currents flowing through the three phases is zero in the three-phase three-line rotating machine, the acquired detected current values for the two phases are used to calculate a current of the remaining one phase. In other words, only such a configuration that appropriate voltage vectors are selected to detect the currents for at least two phases is necessary.

A position detector 100 is configured to output a phase θ of the AC rotating machine 1 to the switching signal generation part 5.

Figure 4:
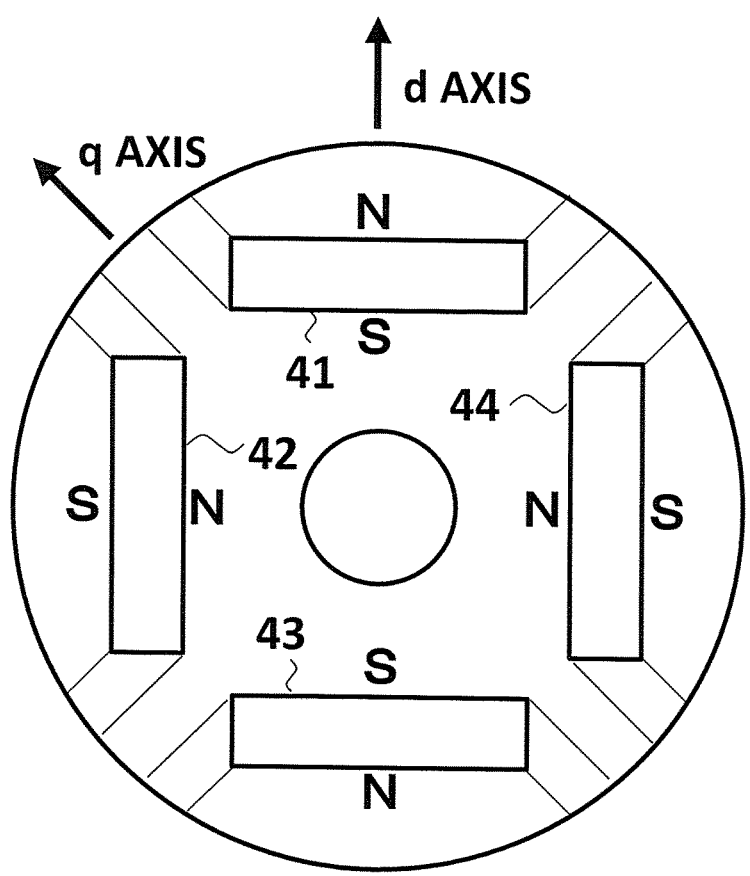
FIG. 4 is a diagram for illustrating an example of a basic structure of a rotor of the AC rotating machine of FIG. 1.

A detailed description is now given of the AC rotating machine 1. FIG. 4 is a diagram for illustrating a basic structure of a rotor of the AC rotating machine 1, and showing such a structure that permanent magnets 41 to 44 are embedded inside an iron core. Flux barriers are provided on both ends of each of the permanent magnets 41 to 44. In FIG. 4, a direction of a field pole generated by the permanent magnets is set to the d axis, and a direction advanced by 90 degrees in the electrical angle is set to the q axis. A case of a four-pole machine is illustrated in FIG. 4, and a direction advanced in 45 degrees in the mechanical angle with respect to the d axis is the q axis. The rotating machine 1 having this rotor structure is referred to as interior magnet synchronous rotating machine and has saliency, and there is a relationship Ld<Lq between a d axis inductance Ld and a q axis inductance Lq.

A description has been given of the interior magnet type synchronous rotating machine, but the present invention is geared toward all the AC rotating machines having saliency, namely, such a characteristic that Ld≠Lq and a saliency ratio ρ=Lq/Ld is not equal to 1.

For example, the present invention can be applied to other AC rotating machines having a saliency, e.g., an inset permanent magnet synchronous rotating machine, a synchronous reluctance motor, and a switched reluctance motor. Moreover, a description has been given of the rotor having four poles in FIG. 4, but the present invention can be applied to an AC rotating machine having an arbitrary number of poles as long as the number of poles is an even natural number (not including 0).

Figure 5:
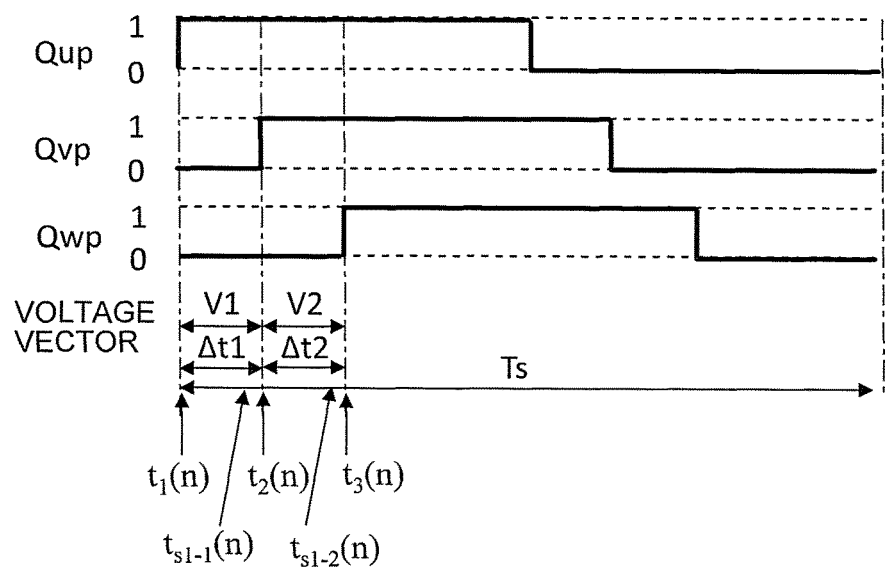
FIG. 5 is an operation explanatory diagram for illustrating an example of switching signals in a switching signal generation part, detection timings for a bus current in a current detection part, and the voltage vectors in the power conversion device according to the first embodiment of the present invention.

A detailed description is now given of the switching signal generation part 5. FIG. 5 is an operation explanatory diagram relating to a method of generating the switching signals Qup to Qwn in the switching signal generation part 5, and the detection timings of the bus current Idc in the current detection part 7 in a cycle Ts of the switching signals according to the first embodiment. Qun, Qvn, and Qwn illustrated in FIG. 2 are respectively in an inverted relationship (0 for 1 and 1 for 0 except for a dead time period) with Qup, Qvp, and Qwp, and are thus not illustrated.

Qup is set to 1, and Qvp and Qwp are set to 0 at a time point t1(n), and this switching pattern is maintained until a time point t2(n) after an elapse of Δt1 from the time point t1(n). With reference to FIG. 2, the voltage vector is V1 from the time point t1(n) to the time point t2(n). A first bus current Idc is detected at a time point ts1-1(n) in the period from the time point t1(n) to the time point t2(n). Δt1 is set to a period longer than a sum of a dead time of the power conversion part 3 and a period for the current detection part 7 to detect the bus current Idc (such as a period required for settlement of ringing included in a detected waveform and a period required for the sampling and holding). With reference to FIG. 2, the voltage vector is V1 from the time point t1(n) to the time point t2(n), and the bus current Idc detected at the time point ts1-1(n) is equal to the current Iu flowing through the U phase.

Then, Qvp is set to 1 at the time point t2(n), and this switching pattern is maintained until a time point t3(n). With reference to FIG. 2, the voltage vector is V2 from the time point t2(n) to a time point t3(n). The bus current Idc is again detected at a time point ts1-2(n) at this timing. Δt2 is determined in the same way as in the case of Δt1. In general, Δt1=Δt2 is set. With reference to FIG. 2, the bus current Idc detected at the time point ts1-2(n) is equal to a value -Iw acquired by inverting the sign of the current flowing through the W phase. Then, Qwp is set to 1 at the time point t3(n). Pulse widths (periods in which the value 1 is maintained) of Qup to Qwp are determined by the voltage commands Vu, Vv, and Vw, and timings at which Qup to Qwp become 0 are thus determined in accordance with the pulse widths.

In the example illustrated in FIG. 5, the two voltage vectors V1 and V2 are generated by setting Qup, Qvp, and Qwp to 1 in this sequence, and the bus current Idc is detected during the generations of those voltage vectors in this way. On this occasion, the following five cases other than the example of FIG. 5 are conceivable by switching the sequence of setting the switching signals Qup to Qwp to 1.

Figure 6:
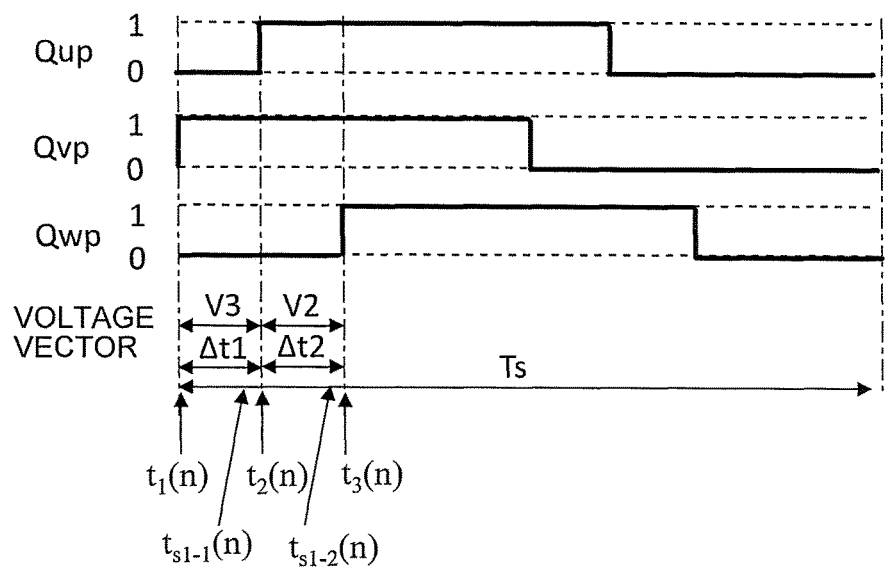
FIG. 6 is an operation explanatory diagram for illustrating another example of the switching signals in the switching signal generation part, the detection timings for the bus current in the current detection part, and the voltage vectors in the power conversion device according to the first embodiment of the present invention.

In a first case, as illustrated in FIG. 6, the two voltage vectors V3 and V2 are generated by setting Qvp, Qup, and Qwp to 1 in this sequence, and the bus current Idc is detected during the generations of those voltage vectors. With reference to FIG. 2, the bus current Idc detected at the time point ts1-1(n) is equal to the current Iv flowing through the V phase, and the bus current Idc detected at the time point ts1-2(n) is equal to a sign-inverted value −Iw of the current flowing through the W phase.

Figure 7:
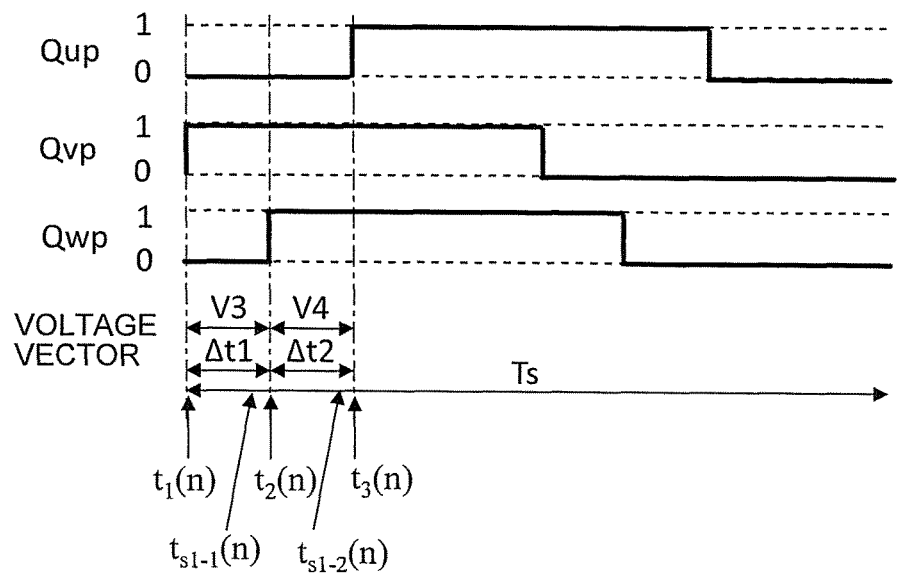
FIG. 7 is an operation explanatory diagram for illustrating another example of the switching signals in the switching signal generation part, the detection timings for the bus current in the current detection part, and the voltage vectors in the power conversion device according to the first embodiment of the present invention.

In a second case, as illustrated in FIG. 7, the two voltage vectors V3 and V4 are generated by setting Qvp, Qwp, and Qup to 1 in this sequence, and the bus current Idc is detected during the generations of those voltage vectors. With reference to FIG. 2, the bus current Idc detected at the time point ts1-1(n) is equal to the current Iv flowing through the V phase, and the bus current Idc detected at the time point ts1-2(n) is equal to a sign-inverted value −Iu of the current flowing through the U phase.

Figure 8:
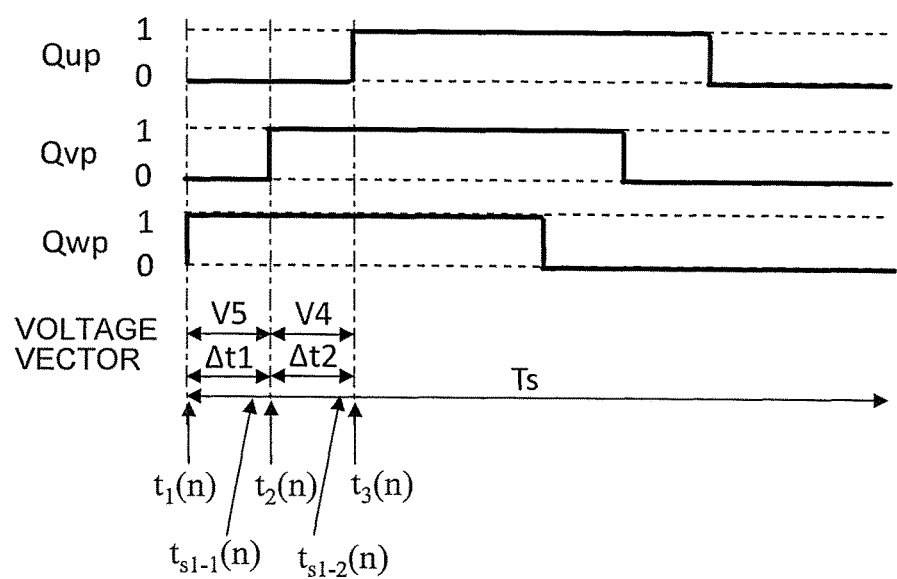
FIG. 8 is an operation explanatory diagram for illustrating another example of the switching signals in the switching signal generation part, the detection timings for the bus current in the current detection part, and the voltage vectors in the power conversion device according to the first embodiment of the present invention.

In a third case, as illustrated in FIG. 8, the two voltage vectors V5 and V4 are generated by setting Qwp, Qvp, and Qup to 1 in this sequence, and the bus current Idc is detected during the generations of those voltage vectors. With reference to FIG. 2, the bus current Idc detected at the time point ts1-1(n) is equal to the current Iw flowing through the W phase, and the bus current Idc detected at the time point ts1-2(n) is equal to the sign-inverted value −Iu of the current flowing through the U phase.

Figure 9:
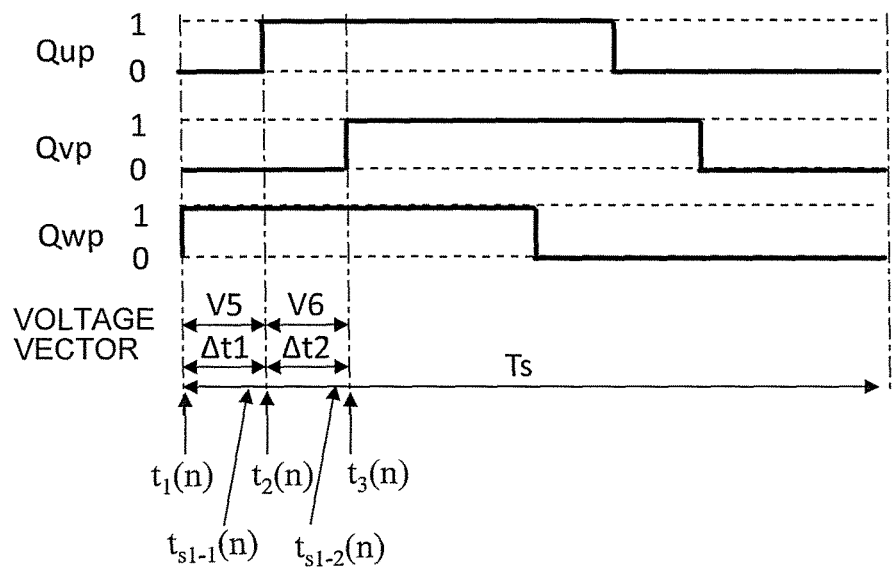
FIG. 9 is an operation explanatory diagram for illustrating another example of the switching signals in the switching signal generation part, the detection timings for the bus current in the current detection part, and the voltage vectors in the power conversion device according to the first embodiment of the present invention.

In a fourth case, as illustrated in FIG. 9, the two voltage vectors V5 and V6 are generated by setting Qwp, Qup, and Qvp to 1 in this sequence, and the bus current Idc is detected during the generations of those voltage vectors. With reference to FIG. 2, the bus current Idc detected at the time point ts1-1(n) is equal to the current Iw flowing through the W phase, and the bus current Idc detected at the time point ts1-2(n) is equal to a sign-inverted value −Iv of the current flowing through the V phase.

Figure 10:
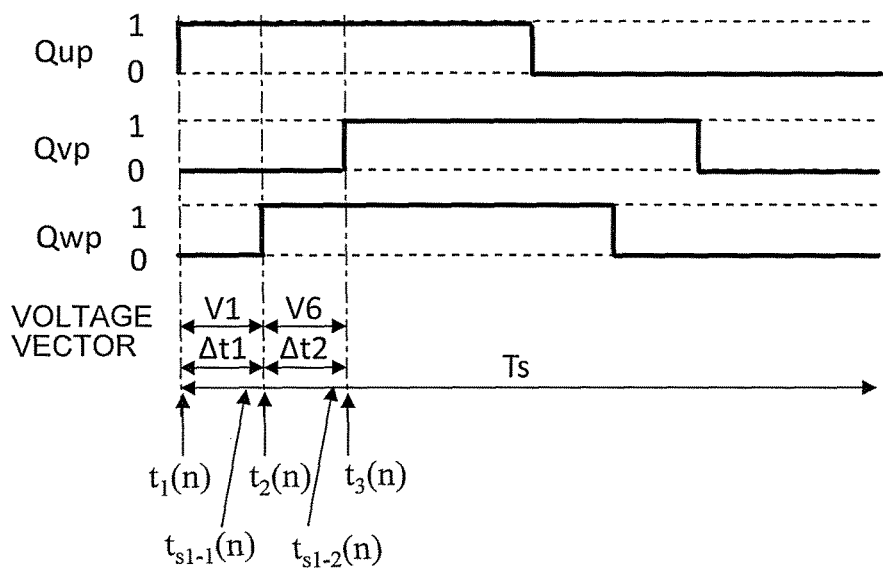
FIG. 10 is an operation explanatory diagram for illustrating another example of the switching signals in the switching signal generation part, the detection timings for the bus current in the current detection part, and the voltage vectors in the power conversion device according to the first embodiment of the present invention.

In a fifth case, as illustrated in FIG. 10, the two voltage vectors V1 and V6 are generated by setting Qup, Qwp, and Qvp to 1 in this sequence, and the bus current Idc is detected during the generations of those voltage vectors. With reference to FIG. 2, the bus current Idc detected at the time point ts1-1(n) is equal to the current Iu flowing through the U phase, and the bus current Idc detected at the time point ts1-2(n) is equal to a sign-inverted value −Iv of the current flowing through the V phase.

According to the first embodiment, the combinations ("V1, V2", "V3, V2", "V3, V4", "V5, V4", "V5, V6", and "V1, V6") of the two voltage vectors in the six patterns illustrated in FIG. 5 to FIG. 10 upon the bus current detections are switched to be output in accordance with the rotational position θ of the AC rotating machine 1.

FIG. 11 is a table for showing a relationship among the rotational position θ of the AC rotating machine 1, the q axis phase θq (=θ+90 degrees), and two voltage vectors upon the detection of the bus current Idc according to the first embodiment. On this occasion, a reference phase (0 degrees) of θ and θq is the U phase direction. According to the first embodiment, the two voltage vectors upon the bus current Idc detection are determined in accordance with the relationship of FIG. 11. From FIG. 11, for example, when θq is in a range of from 0 degrees to 60 degrees, voltage vectors V1 and V2 illustrated in FIG. 5 are output, that is, the switching signal generation part 5 outputs the switching signals Qup to Qwn to the power conversion part 3 so as to output the voltage vectors V1 and V2 (the same applies in the following). In other ranges of θq, two voltage vectors are similarly generated in accordance with FIG. 11.

Figure 12:
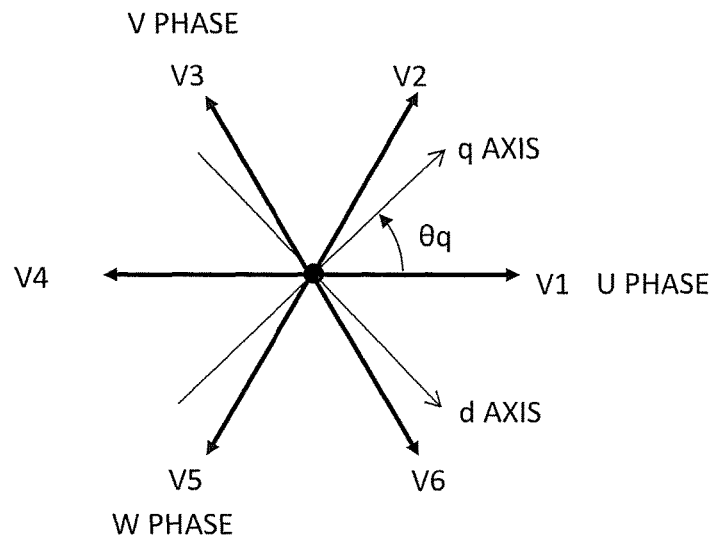
FIG. 12 is a diagram for illustrating a dq axis coordinate and the q axis phase $\theta q$ when $\theta q$ is in a range of from 0 degrees to 60 degrees in addition to the diagram of FIG. 3.

FIG. 12 is a diagram for illustrating a dq axis coordinate and the q axis phase θq in addition to the diagram of FIG. 3. FIG. 12 is a diagram for illustrating a case where θq is in a range of from 0 degrees to 60 degrees. In this case, the two vectors on both sides of the q axis are V1 and V2. Although not shown, when θq is in ranges of from 60 degrees to 120 degrees, 120 degrees to 180 degrees, 180 degrees to 240 degrees, 240 degrees to 300 degrees, and 300 degrees to 360 degrees, the two vectors on both sides of the Q axis are "V3 and V2", "V3 and V4", "V5 and V4", "V5 and V6", and "V1 and V6", respectively. Thus, it is appreciated that the two voltage vectors corresponding to θq of FIG. 11 are two voltage vectors on both sides of the q axis. As described above, the AC rotating machine 1 has the relationship Ld<Lq, and, in this case, the selection of the two voltage vectors on both sides of the q axis is equal to selection of two voltage vectors on both sides of an axis having a larger inductance out of the d and q axes.

A description is now given of an effect of detecting the bus current upon the output of the two voltage vectors on both sides of the axis having a larger inductance out of the d and q axes.

Referring to FIG. 2, in order to detect the currents Iu, Iv, and Iw flowing through the three-phase winding of the AC rotating machine 1 based on the bus current Idc, two voltage vectors out of V1 to V6 other than the voltage vectors V0 and V7 need to be output so as to reproduce the currents in two phases out of Iu, Iv, and Iw based on the bus current Idc. One voltage vector out of the two voltage vectors is output for a period Δt1, and the other voltage vector is output for a period Δt2. Thus, Iu, Iv, and Iw fluctuate during those periods.

Figure 13:
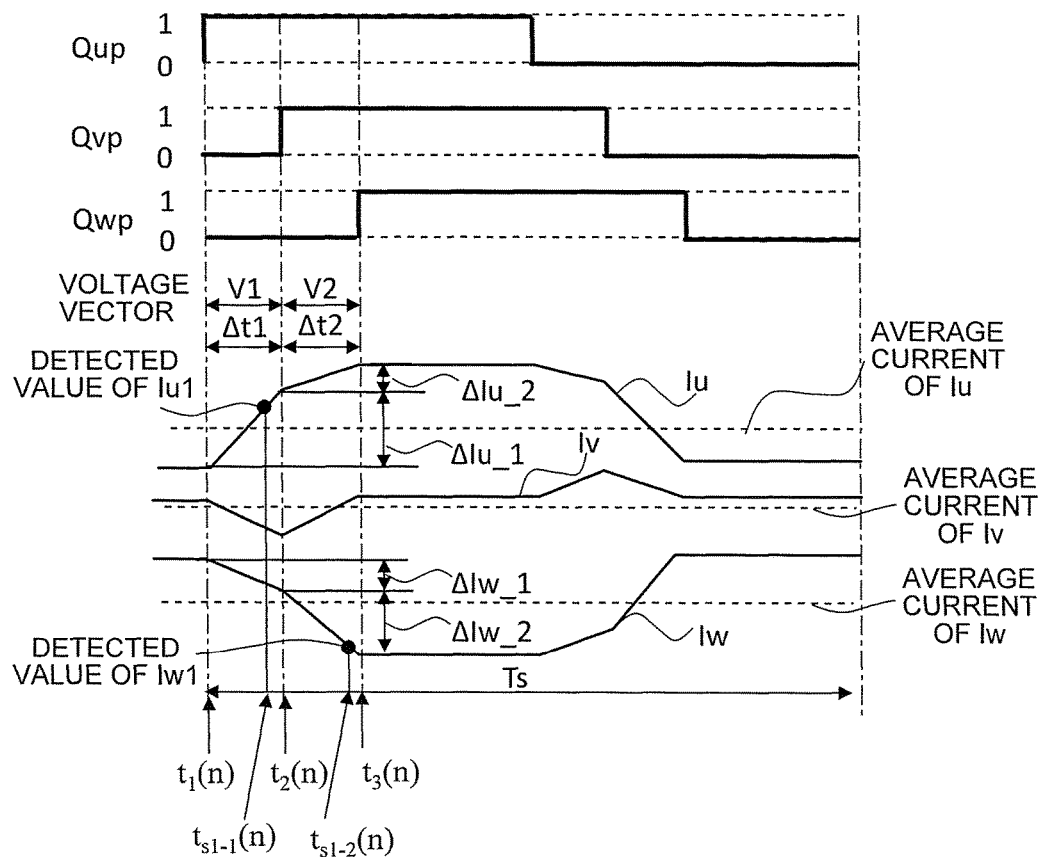
FIG. 13 is a diagram for illustrating currents Iu, Iv, and Iw flowing through the three-phase winding in addition to the diagram of FIG. 5.

FIG. 13 is a diagram for illustrating the currents Iu, Iv, and Iw flowing through the three-phase winding in addition to the diagram of FIG. 5. With reference to FIG. 13, Iu varies by amounts ΔIu_1 and ΔIu_2, and Iw varies by amounts ΔIw_1 and ΔIw_2 during Δ1 and Δ2, respectively. With reference to FIG. 12, the average current of Iu and the average current of Iw do not respectively match a detection value of Iu and a detection value of Iw, resulting in generation of detection errors.

In the related art, there is disclosed the example in which the current detection correction part uses the power supply voltage of the inverter, the duty command values for the respective phases, the counter electromotive voltage information on the motor, the motor currents in the respective phases detected by the current detector, the arrangement information on the PWM, and the electrical characteristic equation of the motor to calculate the current detection correction value, thereby correcting the detection error to acquire the average current. However, the calculation of the correction value requires a large amount of calculation, resulting in such a problem that implementation by using an inexpensive microcomputer is difficult. Further, temperature fluctuation of the motor causes fluctuation in the flux interlinkage number, which is proportional to a resistance R and a counter electromotive voltage EMF of the motor. Moreover, an inductance L of the motor fluctuates due to influence of magnetic saturation when a current is supplied to the winding of the motor. When the motor constants fluctuate in this way, and errors occur between the motor constants and motor constants stored in the current detection correction part, and an error occurs between a difference between the motor current in each phase detected by the current detector and the motor average current and the current detection correction value, resulting in such a problem that the motor currents in the respective phases detected by the current detector cannot be corrected to acquire the motor average current. Moreover, even when such a countermeasure that correction reflecting the variations in the motor constants is made in the current detection correction part is taken, there arises such a new problem that the countermeasure requires further calculation.

A description is now given of advantages of the present invention over the related art. A variation amount of the current during the output of the voltage vectors V1 to V6 other than V0 and V7 is inversely proportional to the inductance value in the direction of the voltage vector. Thus, a voltage vector close to an axis having a large inductance only needs to be selected in order to decrease the variation amount of the current. For example, regarding the AC rotating machine 1 having the relationship Lq>Ld, when a voltage vector close to the q axis is selected, the inductance in the direction of the voltage vector becomes larger, and as a result, the current variation amount can be decreased.

Figure 14:
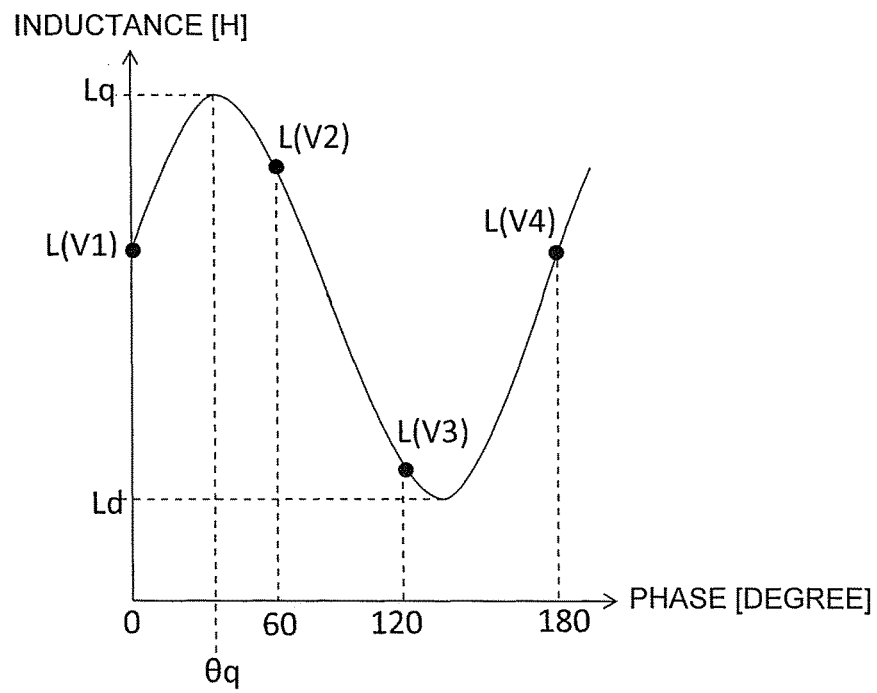
FIG. 14 is a graph for showing a phase-inductance characteristic when $\theta q$ exists in a range of from 0 degrees to 180 degrees in the power conversion device according to the first embodiment of the present invention.

FIG. 14 is a diagram for illustrating a phase-inductance characteristic when θq exists in a range of from 0 degrees to 180 degrees. L(V1), L(V2), L(V3), and L(V4) are inductance values in directions of V1, V2, V3, and V4, respectively. The inductance characteristic of the AC rotating machine 1 is a characteristic on a sinusoidal wave having the maximum value Lq, the minimum value Ld, and a cycle of 180 degrees. Thus, a phase closer to the q axis has a larger inductance value. In FIG. 14, it is appreciated that the inductances L(V1) and L(V2) corresponding to the V1 and V2 close in the phase to the q axis are values equal to or more than the other inductance values. Moreover, those two voltage vectors V1 and V2 close to the q axis are on both sides of the q axis. Thus, according to the present invention, the bus current Idc is detected when the two voltage vectors on both sides of the axis having a large inductance are output. As a result, the variation amounts of the currents Iu, Iv, and Iw flowing through the three-phase winding can be decreased during the output of the two voltage vectors.

Thus, the calculation by the current detection correction part is not necessary as in the related art, and the currents Iu, Iv, and Iw flowing through the three-phase winding can precisely be acquired. In other words, according to the present invention, the bus current is detected when the two voltage vectors on both sides of the axis having a large inductance are output, and for example, in FIG. 13, the variation values ΔIu_1 and ΔIu_2 of Iu can be decreased, and further, the variation values ΔIw_1 and ΔIw_2 of Iw can be decreased through simple calculation. Thus, the values respectively closer to the average current Iu and the average current Iw can be acquired as a detection value of Iu and a detection value of Iw.

According to this first embodiment, a description has been given of the example in which the two voltage vectors on the both sides of the q axis are selected for the AC rotating machine having the relationship Lq>Ld, but the inductance in the q axis direction and the inductance in the −q axis direction are approximately the same in this AC rotating machine, and when two voltage vectors on both sides of the −q axis are selected, the same effect can be provided. Moreover, regarding an AC rotating machine having a relationship Ld>Lq, the same effect can be provided by selecting two voltage vectors on both sides of the d axis or the −d axis.

Moreover, two voltage vectors for supplying a current from the DC power supply 2 to the AC rotating machine 1 (hereinafter referred to as power running mode) upon the current detection in the power running operation state may be selected by the switching signal generation part 5. A description is now given of an effect obtained through this selection.

Figure 15:
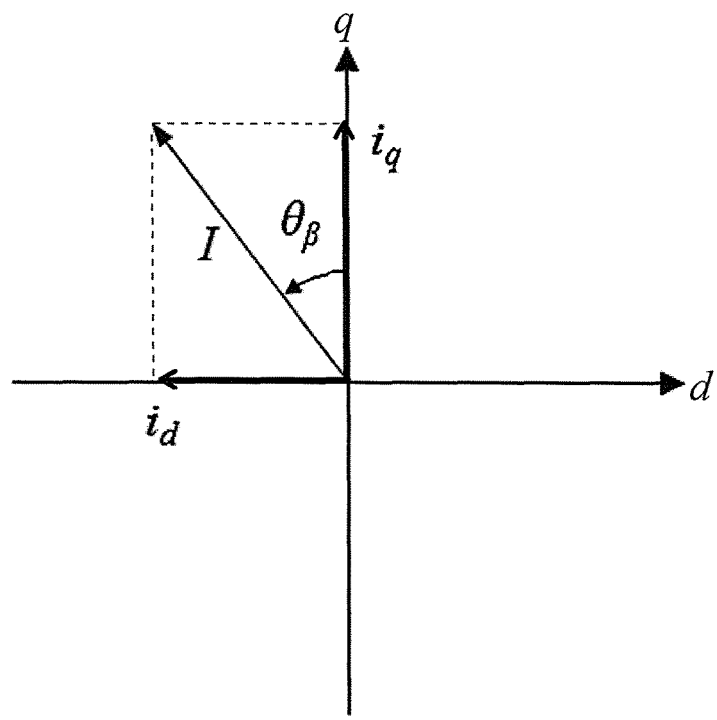
FIG. 15 is a graph for showing a current vector on a plane having d and q axes in the power conversion device as its axes according to the first embodiment of the present invention.

When a current vector is defined as illustrated in FIG. 15, a distribution among the three-phase currents changes depending on the phase angle θβ of the current vector even for the same phase θ. A description is now given of a case where the phase angle θβ of the current vector is 180 degrees as an example.

Figure 17:
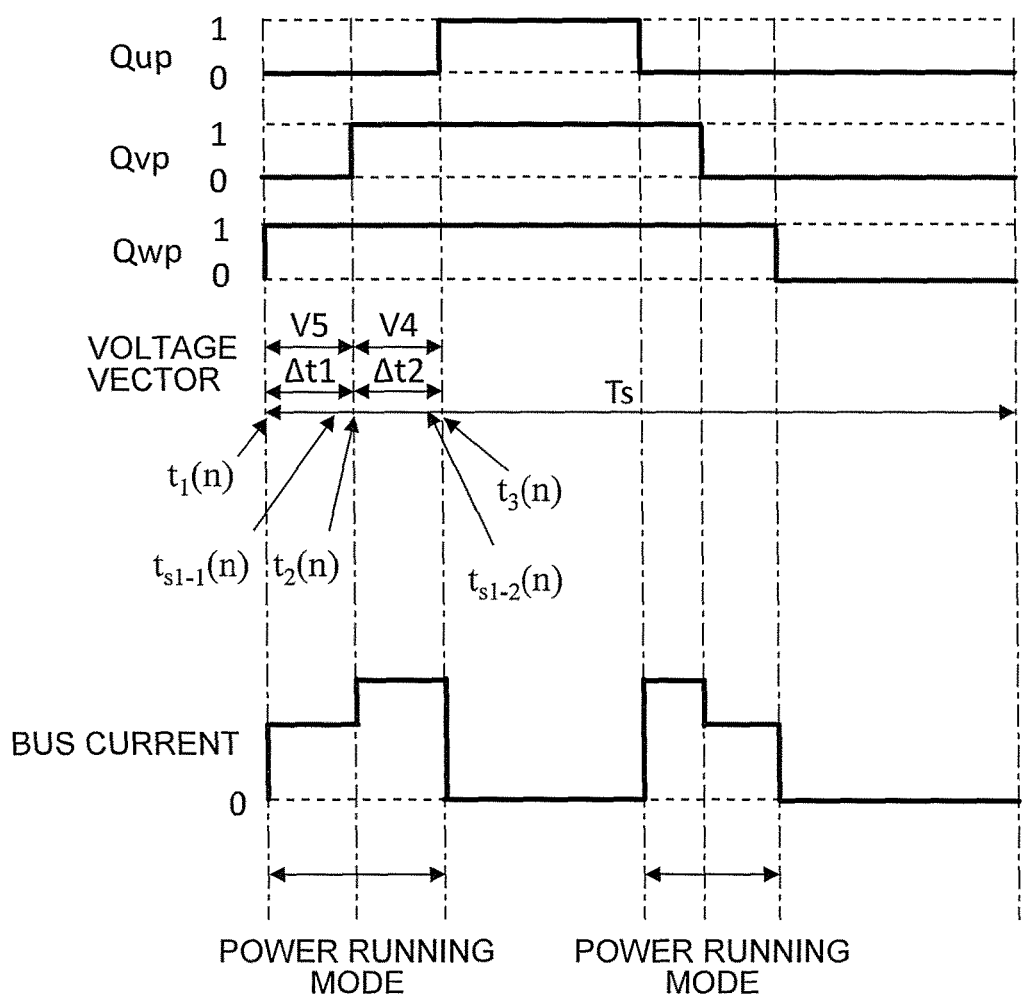
FIG. 17 is an operation explanatory diagram for illustrating an example of the switching signals in the switching signal generation part, the detection timings for the bus current in the current detection part, the voltage vectors, and the bus current at the phase $\theta$ of 300 degrees when the AC rotating machine is in a power running operation state in the power conversion device according to the first embodiment of the present invention.

On this occasion, as illustrated in FIG. 16, two voltage vectors are selected. In FIG. 17, the bus current and the voltage vectors when the AC rotating machine 1 is in the power running operation state, and the phase θ is 300 degrees are illustrated. FIG. 17 is a diagram for illustrating an operation when the two voltage vectors V5 and V4 are generated by setting Qwp, Qvp, and Qup to 1 in this sequence, and the bus current Idc is detected during the generations of the voltage vectors. The sum of the three-phase currents is zero, and when any one of the three-phase currents has a different value, the current in at least one phase has thus a negative value.

The bus current Idc detected at the time point ts1-1($n$) is equal to the current Iw flowing through the W phase, the bus current Idc has a positive value, and the mode is in the power running mode in which the bus current Idc flows from the DC power supply 2 to the AC rotating machine 1.

The bus current Idc detected at the time point ts1-2($n$) is equal to the sign-inverted value −Iu of the current flowing through the U phase, the bus current Idc has a positive value, and the mode is in the power running mode in which the bus current Idc flows from the DC power supply 2 to the AC rotating machine 1.

Figure 18:
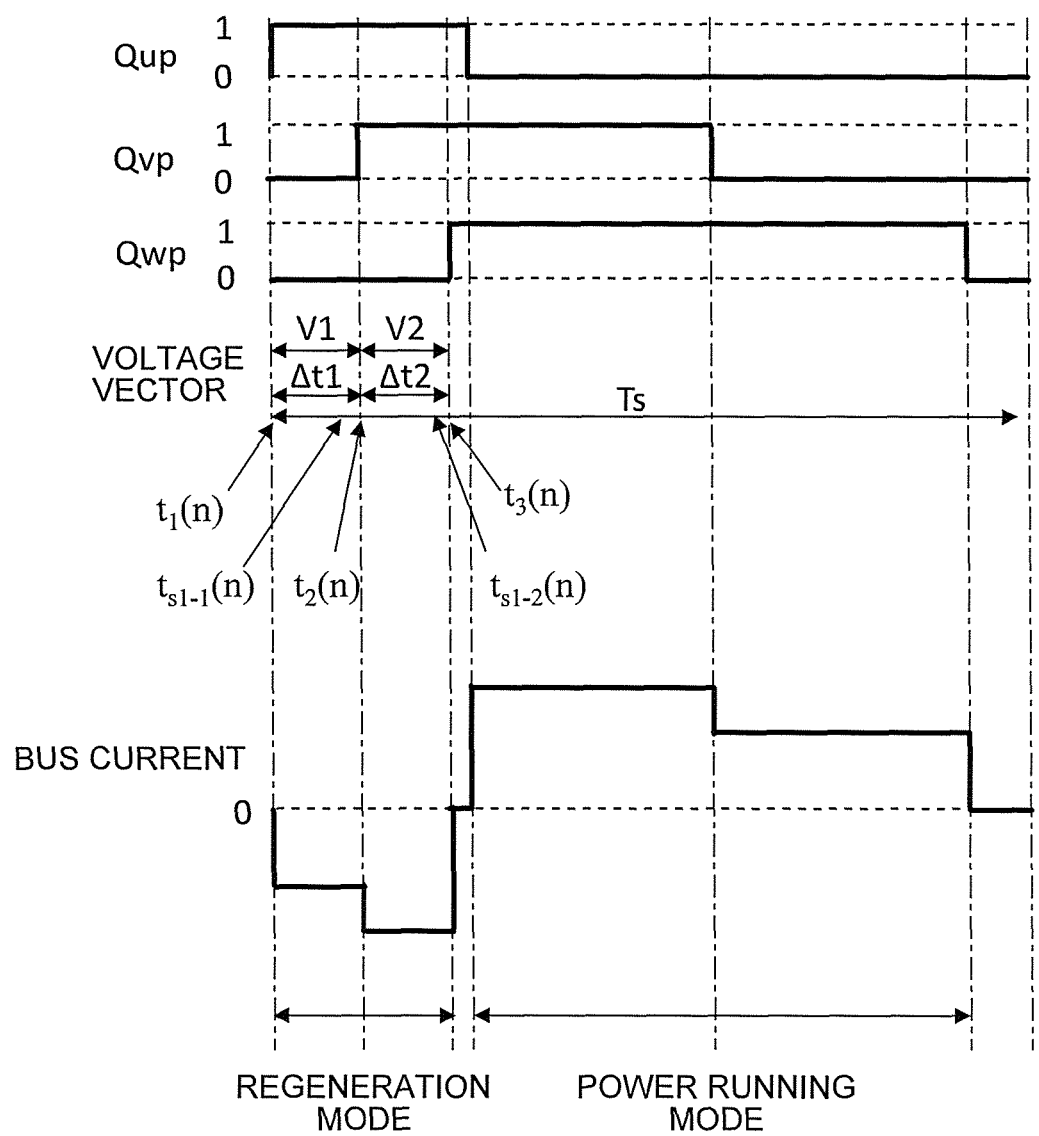
FIG. 18 is an operation explanatory diagram for illustrating an example of the switching signals in the switching signal generation part, the detection timings for the bus current in the current detection part, the voltage vectors, and the bus current at the phase $\theta$ of 300 degrees when the AC rotating machine is in the power running operation state in the power conversion device according to the first embodiment of the present invention.

On the other hand, a comparison is made to a case where the two vectors are selected as shown in FIG. 11. In FIG. 18, the bus current and the voltage vector when the AC rotating machine 1 is in the power running operation state and the phase θ is 300 degrees are illustrated. FIG. 18 is a diagram for illustrating an operation when the two voltage vectors V1 and V2 are generated by setting Qup, Qvp, and Qwp to 1 in this sequence, and the bus current Idc is detected during the generations of the voltage vectors.

The bus current Idc detected at the time point ts1-1($n$) is equal to the current Iu flowing through the U phase, the bus current Idc has a negative value, and the mode is in the regeneration mode in which the bus current Idc flows from the DC power supply 2 to the AC rotating machine 1.

The bus current Idc detected at the time point ts1-2($n$) is equal to the sign-inverted value −Iw flowing through the W phase, the bus current Idc has a negative value, and the mode is in the regeneration mode in which the bus current Idc flows from the DC power supply 2 to the AC rotating machine 1.

A power loss is acquired by a product of the square of the bus current Idc and an internal resistance R of the DC power supply 2. When the voltage vectors are selected as shown in FIG. 16, a power loss is generated in portions in the power running mode other than regions in which the voltage vector is V0 or V7. When the voltage vectors are selected as shown in FIG. 11, the period of the power running mode is increased by a period of the regeneration mode, and a power loss is generated even in the regeneration mode. Thus, a power loss increases when the voltage vectors, which bring the mode into the regeneration mode in the power running operation state, are selected.

Thus, the switching signal generation part 5 outputs the two voltage vectors, which bring the mode into the power running mode upon the current detection in the power running operation state, thereby providing such an effect that a power loss can be decreased. On this occasion, a description has been given of the case where the phase angle θβ is 180 degrees and the phase θ is 300 degrees as an example, but it should be understood that another combination is possible.

Moreover, two voltage vectors for bringing the mode into the regeneration mode of supplying a current from the AC rotating machine 1 to the DC power supply 2 upon the current detection in the regeneration operation state may be selected by the switching signal generation part 5.

A description is now given of an effect thereof.

On this occasion, a description is given of a difference in the bus current between combinations of the two voltage vectors for a case where Iu<Iv<0 and Iw>0 while the AC rotating machine 1 is in the regeneration operation state.

Figure 19:
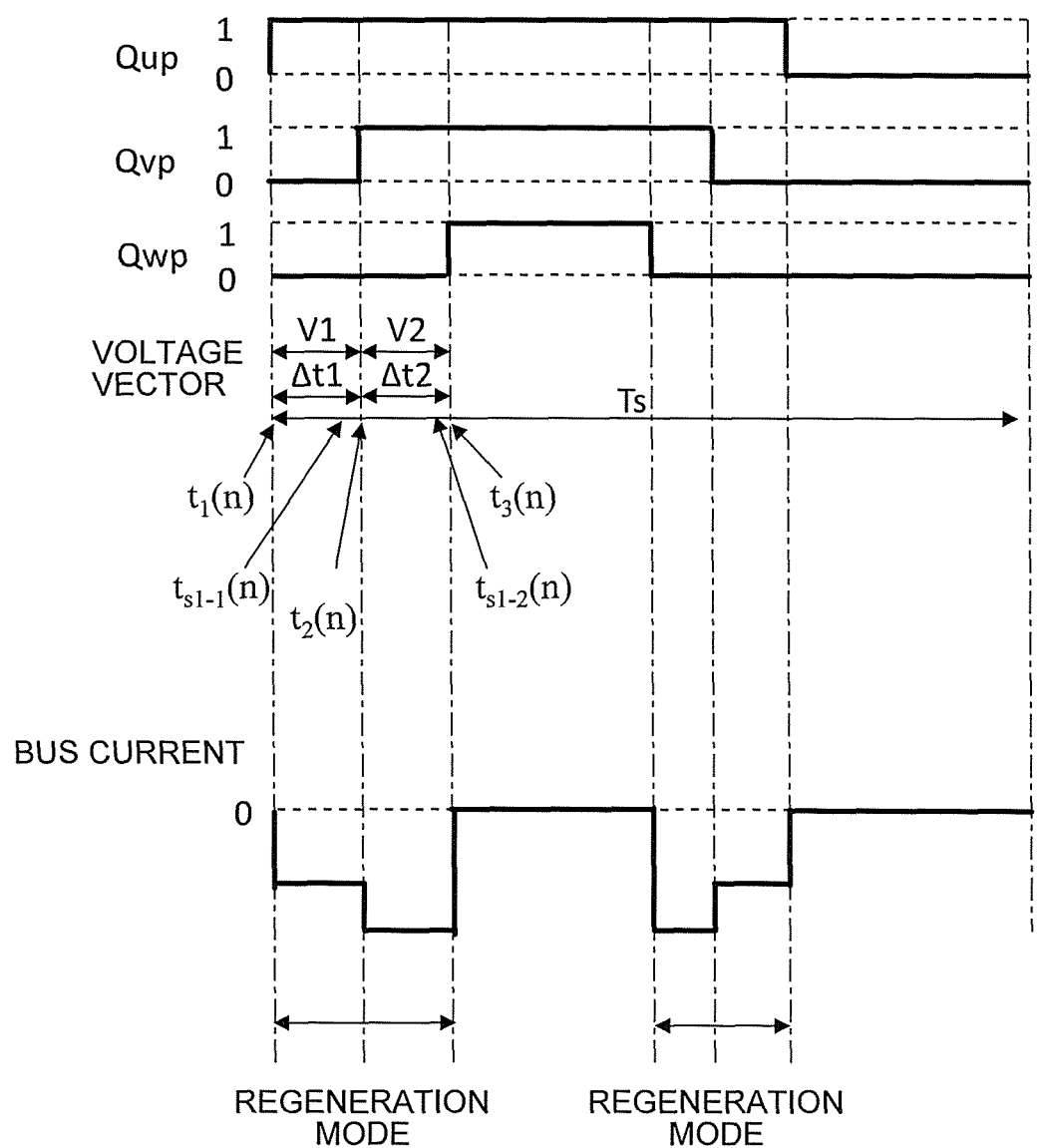
FIG. 19 is an operation explanatory diagram for illustrating an example of the switching signals in the switching signal generation part, the detection timings for the bus current in the current detection part, the voltage vectors, and the bus current in the power conversion device according to the first embodiment of the present invention.

FIG. 19 is a diagram for illustrating an operation when the two voltage vectors V1 and V2 are generated by setting Qup, Qvp, and Qwp to 1 in this sequence, and the bus current Idc is detected during the generations of the voltage vectors when the AC rotating machine 1 is in the regeneration operation state. The sum of the three-phase currents is zero, and when any one of the three-phase currents has a different value, the current in at least one phase has thus a positive value.

The bus current Idc detected at the time point ts1-1($n$) is equal to the current Iu flowing through the U phase, the bus current Idc has a negative value, and the mode is in the regeneration mode in which the bus current Idc flows from the AC rotating machine 1 to the DC power supply 2.

The bus current Idc detected at the time point ts1-2($n$) is equal to the sign inverted value –Iw of the current flowing through the W phase, the bus current Idc has a negative value, and the mode is in the regeneration mode in which the bus current Idc flows from the AC rotating machine 1 to the DC power supply 2.

Figure 20:
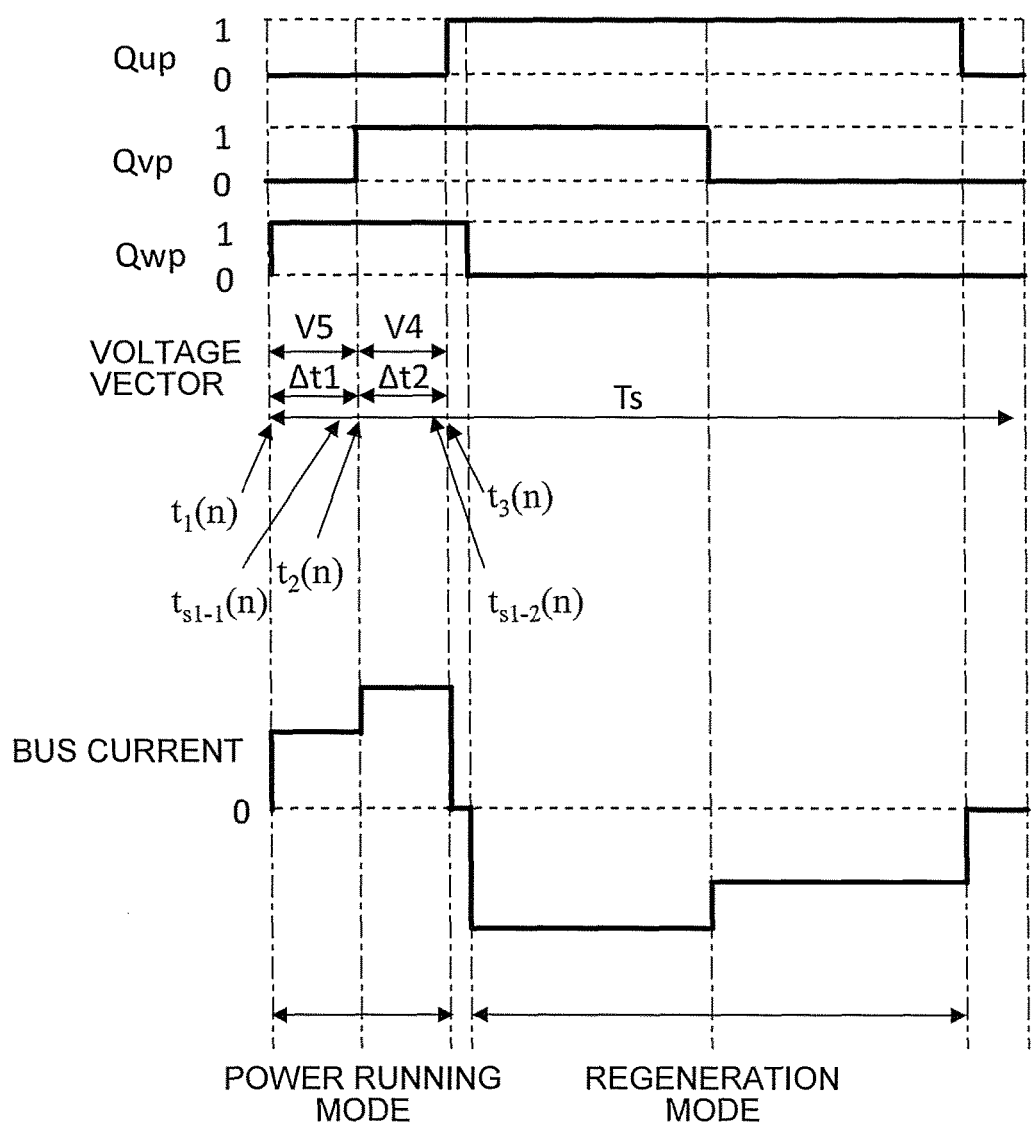
FIG. 20 is an operation explanatory diagram for illustrating another example of the switching signals in the switching signal generation part, the detection timings for the bus current in the current detection part, the voltage vectors, and the bus current in the power conversion device according to the first embodiment of the present invention.

FIG. 20 is a diagram for illustrating a comparative example of an operation when the two voltage vectors V5 and V4 are generated by setting Qvp, Qup, and Qwp to 1 in this sequence, and the bus current Idc is detected during the generations of the voltage vectors.

The bus current Idc detected at the time point ts1-1($n$) is equal to the current Iw flowing through the W phase, the bus current Idc has a positive value, and the mode is in the power running mode in which the bus current Idc flows from the DC power supply 2 to the AC rotating machine 1.

The bus current Idc detected at the time point ts1-2($n$) is equal to the sign inverted value –Iu of the current flowing through the U phase, the bus current Idc has a positive value, and the mode is in the power running mode in which the bus current Idc flows from the DC power supply 2 to the AC rotating machine 1.

A power loss is acquired by a product of the square of the bus current Idc and the internal resistance R of the DC power supply 2. When the voltage vectors are selected as illustrated in FIG. 19, a power loss is generated in portions in the regeneration mode other than regions in which the voltage vector is V0 or V7. When the voltage vectors are selected as illustrated in FIG. 20, the period of the regeneration mode is increased by a period of the power running mode, and a power loss is generated even in the power running mode. Thus, a power loss increases when the voltage vectors, which bring the mode into the power running mode in the regeneration operation state, are selected.

Thus, the switching signal generation part 5 outputs the two voltage vectors, which bring the two voltage vectors into the regeneration mode upon the current detection in the regeneration operation state, thereby providing such an effect that a power loss can be decreased. A description has been given of a case where Iu<Iv and Iw>0 as an example, but the combination of the three-phase currents is not limited to this case.

When an amplitude Vmap of the voltage commands Vu, Vv, and Vw becomes more than a threshold set in advance, as shown in FIG. 21, the two voltage vectors for the detection of the bus current may be selected based on a sequence in the amplitude of the voltage command or the voltage phase θv.

Figure 22:
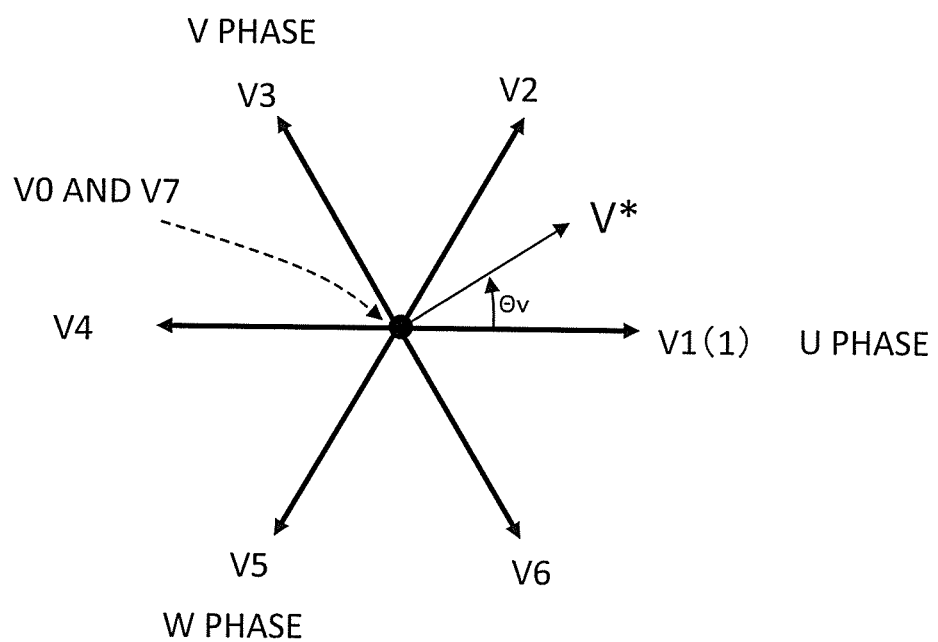
FIG. 22 is a diagram for illustrating an angle $\theta v$ of a voltage command vector V* while a U1 phase direction is set as a reference in addition to the diagram of FIG. 3.

As illustrated in FIG. 22, the voltage phase is an angle θv of a voltage command vector V* while the U1 phase direction is set as a reference. The voltage command V* is represented as follows through the voltage commands Vu, Vv, and Vw of the first winding.

$$V^*=2/3\times(Vu+Vv\times\exp(j120)+Vw\times\exp(1120))=Vamp\times\exp(j\theta v)$$

where:

$$Vu=Vamp\times\cos(\theta v);$$

$$Vv=Vamp\times\cos(\theta v-120);$$

$$Vw=Vamp\times\cos(\theta v+120);$$

Vamp: pulse width of first voltage command; and
j: imaginary unit (j×j=–1)

Moreover, as shown in FIG. 21, the selection of the two voltage vectors in accordance with the voltage phase θv or the sequence in the amplitude of the voltage commands is equivalent to selection of two voltage vectors neighboring the voltage command vector V*.

Further, the power conversion device according to the present invention can be applied to an electric power steering in which a torque assisting a steering torque of a steering system is generated by the AC rotating machine 1, and as a result, an inexpensive microcomputer can be used to construct a steering system having a small steering torque ripple.

Figure 31:
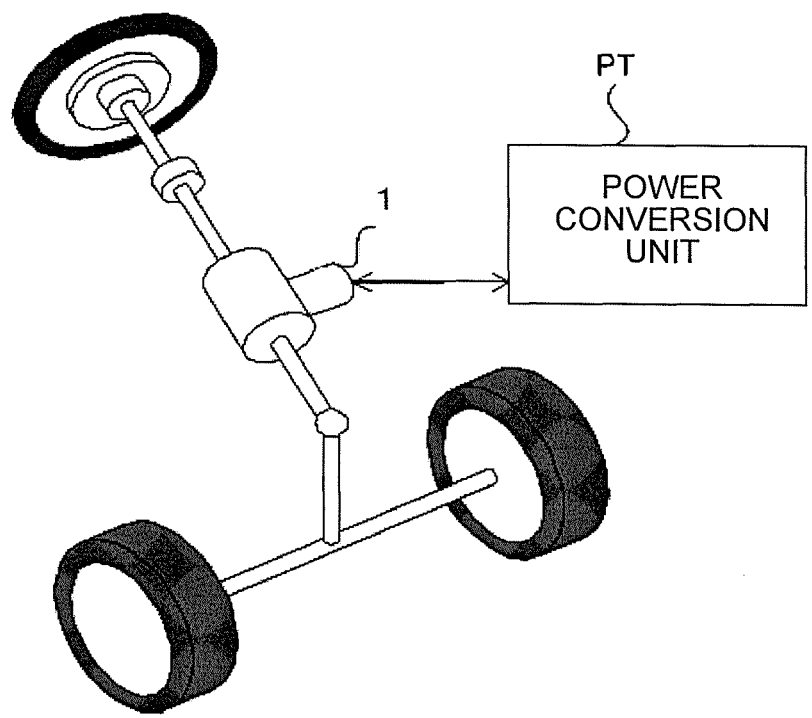
FIG. 31 is a diagram for illustrating an example of a configuration of a control device for an electric power steering for which the power conversion device according to the present invention is provided.

An example of a configuration of a control device for the electric power steering according to the present invention is schematically illustrated in FIG. 31. The AC rotating machine 1 is attached to a steering shaft so as to apply the assist torque, and a power conversion unit PT is constructed by portions other than the AC rotating machine 1 of FIG. 1, and the like.

Second Embodiment

Figure 23:
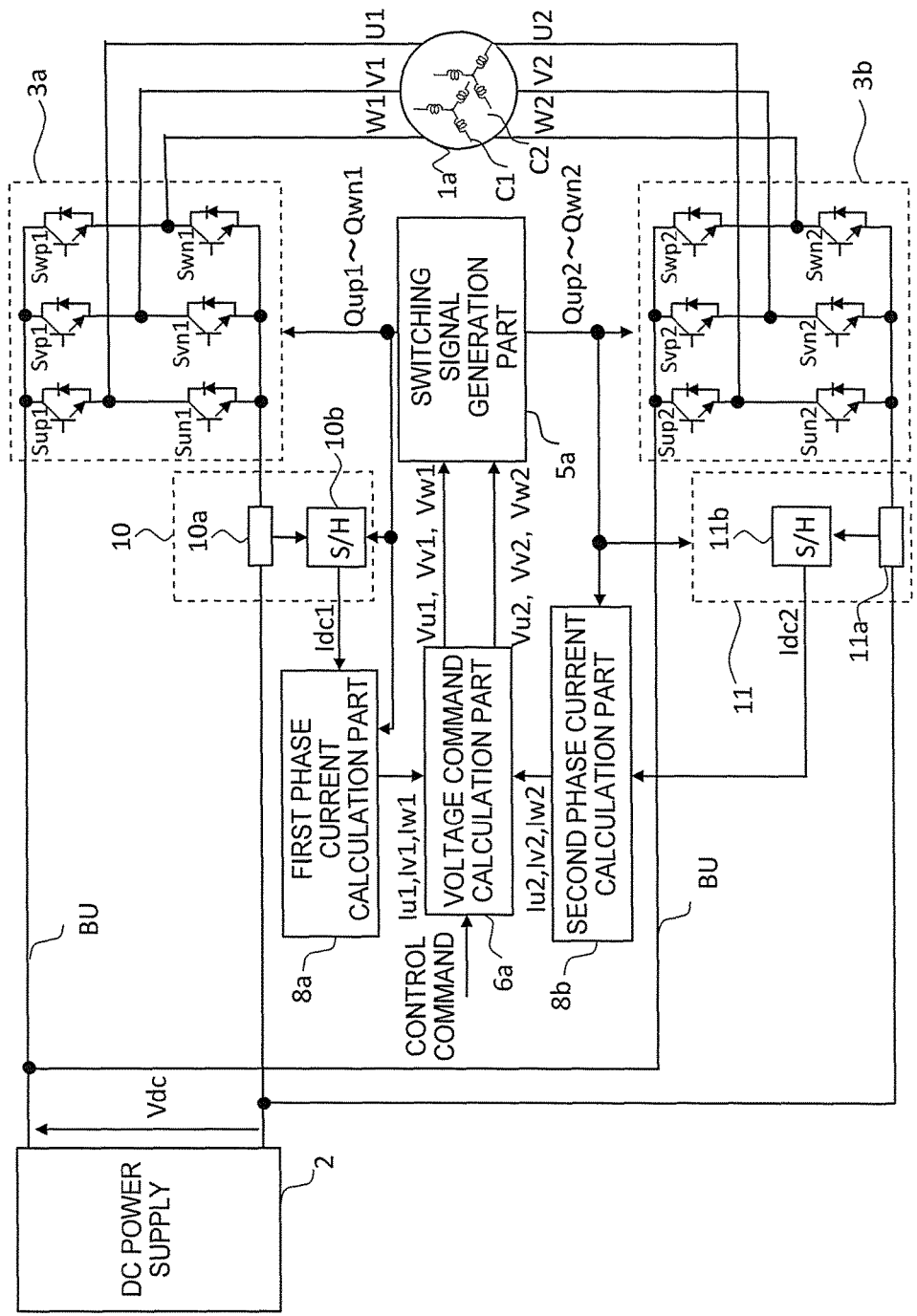
FIG. 23 is a diagram for illustrating an overall configuration of a power conversion device according to a second embodiment of the present invention.

FIG. 23 is a diagram for illustrating an overall configuration of a power conversion device according to a second embodiment of the present invention. A redundant description is not given of portions common to those of the first embodiment. In summary, two systems of electric conversion parts 3$a$ and 3$b$ are connected between the DC power supply 2 and an AC rotating machine 1$a$. A current detection part 10 and a phase current calculation part 8$a$ are provided for the power conversion part 3$a$, and are supplied with the same switching signals Qup1 to Qwn1 from the switching signal generation part 5$a$ as those to the power conversion part 3$a$. Moreover, a current detection part 11 and a phase current calculation part 8$b$ are provided for the power conversion part 3$b$, and are supplied with the same switching signals Qup2 to Qwn2 as those to the power conversion part 3$b$.

The AC rotating machine 1$a$ includes a first three-phase winding (generally, a multi-phase winding) C1 having U1, V1, and W1 phases, and a second three-phase winding (generally, a multi-phase winding) C2 having U2, V2, and W2 phases, and is, for example, a permanent magnet synchronous rotating machine having a phase difference of 30 degrees between the first three-phase winding C1 and the second three-phase winding C2.

The first power conversion part 3a is configured to turn on/off semiconductor switches Sup1 to Swn1 based on first switching signals Qup1 to Qwn1, thereby applying power conversion to the DC voltage Vdc input from the DC power supply 2, and applying AC voltages on the first three-phase winding C1 having U1, V1, and W1 phases of the AC rotating machine 1a. As each of the semiconductor switches Sup1 to Swn1, a semiconductor switching device, e.g., an IGBT, a bipolar transistor, or a MOS power transistor and a diode connected to each other in an anti-parallel connection state are used. On this occasion, the first switching signals Qup1, Qun1, Qvp1, Qvn1, Qwp1, and Qwn1 are switching signals for respectively turning on/off the semiconductor switches Sup1, Sun1, Svp1, Svn1, Swp1, and Swn1 in the first power conversion part 3a.

The second power conversion part 3b is configured to turn on/off semiconductor switches Sup2 to Swn2 based on second switching signals Qup2 to Qwn2, thereby applying power conversion to the DC voltage Vdc input from the DC power supply 2, and applying AC voltages on the second three-phase winding C2 having U2, V2, and W2 phases of the AC rotating machine 1a. As each of the semiconductor switches Sup2 to Swn2, a semiconductor switching device, e.g., an IGBT, a bipolar transistor, or a MOS power transistor and a diode connected to each other in an anti-parallel connection state are used. On this occasion, the second switching signals Qup2, Qun2, Qvp2, Qvn2, Qwp2, and Qwn2 are switching signals for respectively turning on/off the semiconductor switches Sup2, Sun2, Svp2, Svn2, Swp2, and Swn2 in the second power conversion part 3b.

The switching signal generation part 5a is configured to carry out pulse width modulation (PWM modulation) based on the first voltage commands Vu1, Vv1, and Vw1 output from the voltage command calculation part 6a, thereby outputting the switching signals Qup1 to Qwn1 having pulse widths in accordance with Vu1, Vv1, and Vw1, and to carry out pulse width modulation (PWM modulation) based on the second voltage commands Vu2, Vv2, and Vw2 output from the voltage command calculation part 6a, thereby outputting the switching signals Qup2 to Qwn2 having pulse widths in accordance with Vu2, Vv2, and Vw2.

The first current detection part 10 is configured to detect a first bus current Idc1, which is a current flowing between the DC power supply 2 and the power conversion part 3a, and output a detection result to a first phase current calculation part 8a. The first current detection part 10 is constructed by a shunt resistor 10a and a sample-and-hold device 10b configured to sample and hold the current flowing through the shunt resistor 10a, thereby detecting the first bus current Idc1. A current transformer (CT) may be used in place of the shunt resistor 10a, and in this case, an output voltage of the current transformer is sampled and held by the sample-and-hold device 10b, thereby detecting the first bus current Idc1.

The second current detection part 11 is configured to detect a second bus current Idc2, which is a current flowing between the DC power supply 2 and the second power conversion part 3b, and output a detection result to the second phase current calculation part 8b. The second current detection part 11 is constructed by a shunt resistor 11a and a sample-and-hold device 11b configured to sample and hold the current flowing through the shunt resistor 11a, thereby detecting the second bus current Idc2. A current transformer (CT) may be used in place of the shunt resistor 11a, and in this case, an output voltage of the current transformer is sampled and held by the sample-and-hold device 11b, thereby detecting the second bus current Idc2.

Similarly to the voltage command calculation part 6, the voltage command calculation part 6a is configured to calculate the first voltage commands Vu1, Vv1, and Vw1 and the second voltage commands Vu2, Vv2, and Vw2 for driving the AC rotating machine 1a, and output the first voltage commands and the second voltage commands to the switching signal generation part 5a. As a method of calculating the first voltage commands Vu1, Vv1, and Vw1 and the second voltage commands Vu2, Vv2, and Vw2, there exists V/F control of setting a speed (frequency) command f for the AC rotating machine 1a as a control command of FIG. 23 and then determining the amplitudes of the first voltage commands and the second voltage commands.

Moreover, current feedback control or the like is used, which is control of setting current commands for the AC rotating machine 1a as the control commands, calculating, based on differences from the currents Iu1, Iv1, and Iw1 flowing through the first-three phase winding and output from the first phase current calculation part 8a, the first voltage commands Vu1, Vv1, and Vw1 so as to bring the differences to zero through the proportional-integral control, and simultaneously calculating, based on differences between the current commands and the currents Iu2, Iv2, and Iw2 flowing through the second three-phase winding output from the second phase current calculation part 8b, the second voltage commands Vu2, Vv2, and Vw2 so as to bring the differences to zero through the proportional-integral control.

The V/F control is feedforward control, and the first three-phase currents Iu1, Iv1, and Iw1 and the second three-phase current Iu2, Iv2, and Iw2 are not necessary. Thus, in this case, the input of the first three-phase currents Iu1, Iv1, and Iw1 to the voltage command calculation part 6a, and the input of the second three-phase currents Iu2, Iv2, and Iw2 are not indispensable.

A description is now given of a relationship among the first voltage vectors based on the first switching signals Qup1 to Qwn1, a first bus current Idc1, and the currents Iu1, Iv1, and Iw1 flowing through the first three-phase winding.

FIG. 24 is a table for showing the relationship among the first switching signals Qup1 to Qwn1, the first voltage vectors, the first bus current Idc1, and the currents Iu1, Iv1, and Iw1 flowing through the first three-phase winding. FIG. 24 is basically the same as FIG. 2. A suffix (1) of the first voltage vector is assigned to denote the first voltage vector, and is assigned so as to be distinguished from second voltage vectors described later.

FIG. 25 is a table for showing the relationship among the second switching signals Qup2 to Qwn2, the second voltage vectors, the second bus current Idc2, and the currents Iu2, Iv2, and Iw2 flowing through the second three-phase winding. FIG. 25 is basically the same as FIG. 2. A suffix (2) of the second voltage vector is assigned to denote the second voltage vector.

The first phase current calculation part 8a is configured to output Iu1, Iv1, and Iw1 from the relationship shown in FIG. 24 based on the first bus current Idc1 and the first switching signals Qup1 to Qwn1. V0 and V7 cannot be used to detect the three-phase currents based on the bus current. Thus, for example, the voltage vector V1 is output to detect Iu1, and the voltage vector V2 is output to detect −Iw1. There may be provided such a configuration that, based on the fact that a sum of the currents flowing through the three phases is zero in the three-phase three-line rotating machine, the acquired detected current values in the two phases are used to calculate a current in the remaining one phase. In other words, only such a configuration that appropriate voltage vectors are selected, thereby detecting the currents for at least two phases is necessary.

The second phase current calculation part 8b outputs Iu2, Iv2, and Iw2 from the relationship shown in FIG. 25 based on the second bus current Idc2 and the second switching signals Qup2 to Qwn2. V0 and V7 cannot be used to detect the three-phase currents based on the bus current. Thus, for example, the voltage vector V1 is output to detect Iu2, and the voltage vector V2 is output to detect −Iw2. There may be provided such a configuration that, based on the fact that a sum of the currents flowing through the three phases is zero in the three-phase three-line rotating machine, the acquired detected current values in the two phases are used to calculate a current in the remaining one phase. In other words, only such a configuration that appropriate voltage vectors are selected, thereby detecting the currents for at least two phases is necessary.

Figure 26:
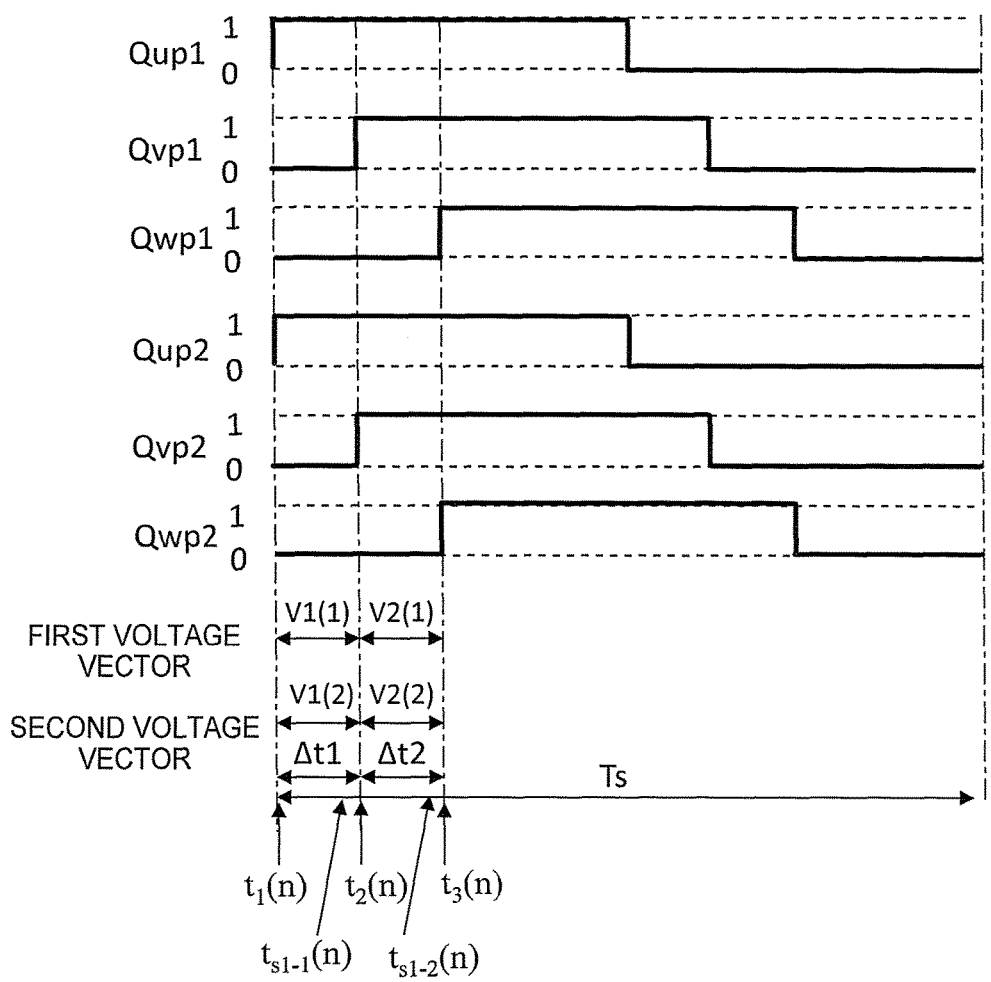
FIG. 26 is an operation explanatory diagram for illustrating an example of the switching signals in the switching signal generation part, the detection timings for the bus current in the current detection part, and the voltage vectors in the power conversion device according to the second embodiment of the present invention.

FIG. 26 is an operation explanatory diagram in the cycle Ts of the switching signal relating to a method of generating the first switching signals Qup1 to Qwn1 and the second switching signals Qup2 to Qwn2 in the second switching signal generation part 5a, and detection timings of the first bus current Idc1 in the first current detection part 10 and the second bus current Idc2 in the second current detection part 11 according to the second embodiment. As shown in FIG. 24 and FIG. 25, Qun1, Qvn1, Qwn1, Qun2, Qvn2, and Qwn2 are in an inverted relationship with Qup1, Qvp1, Qwp1, Qup2, Qvp2, and Qwp2 (1 for 0 and 0 for 1 except for dead time periods), respectively, and are thus omitted.

Qup1 and Qup2 are set to 1, and Qvp1, Qwp1, Qvp2, and Qwp2 are set to 0 at the time point t1(n), and this switching pattern is maintained until the time point t2(n) at which Δt1 has elapsed after the time point t1(n). From FIG. 26, the first voltage vector is V1(1), and the second voltage vector is V1(2) from the time point t1(n) to the time point t2(n). The first bus current Idc1 and the second bus current Idc2 are detected at the time point ts1-1(n) in the period from the time point t1(n) to the time point t2(n).

Then, Qvp1 and Qvp2 are set to 1 at the time point t2(n), and this switching pattern is maintained until the time point t3(n). The first bus current Idc1 and the second bus current Idc2 are again detected at the time point ts1-2(n) in the period.

Then, Qwp1 and Qwp2 are set to 1 at the time point t3(n). Pulse widths (periods in which the value 1 is maintained) of Qup1 to Qwp2 are determined by the first voltage commands Vu1, Vv1, and Vw1 and the second voltage commands Vu2, Vv2, and Vw2, and timings at which Qup1 to Qwp2 become 0 are thus determined in accordance with the pulse widths.

Figure 27:
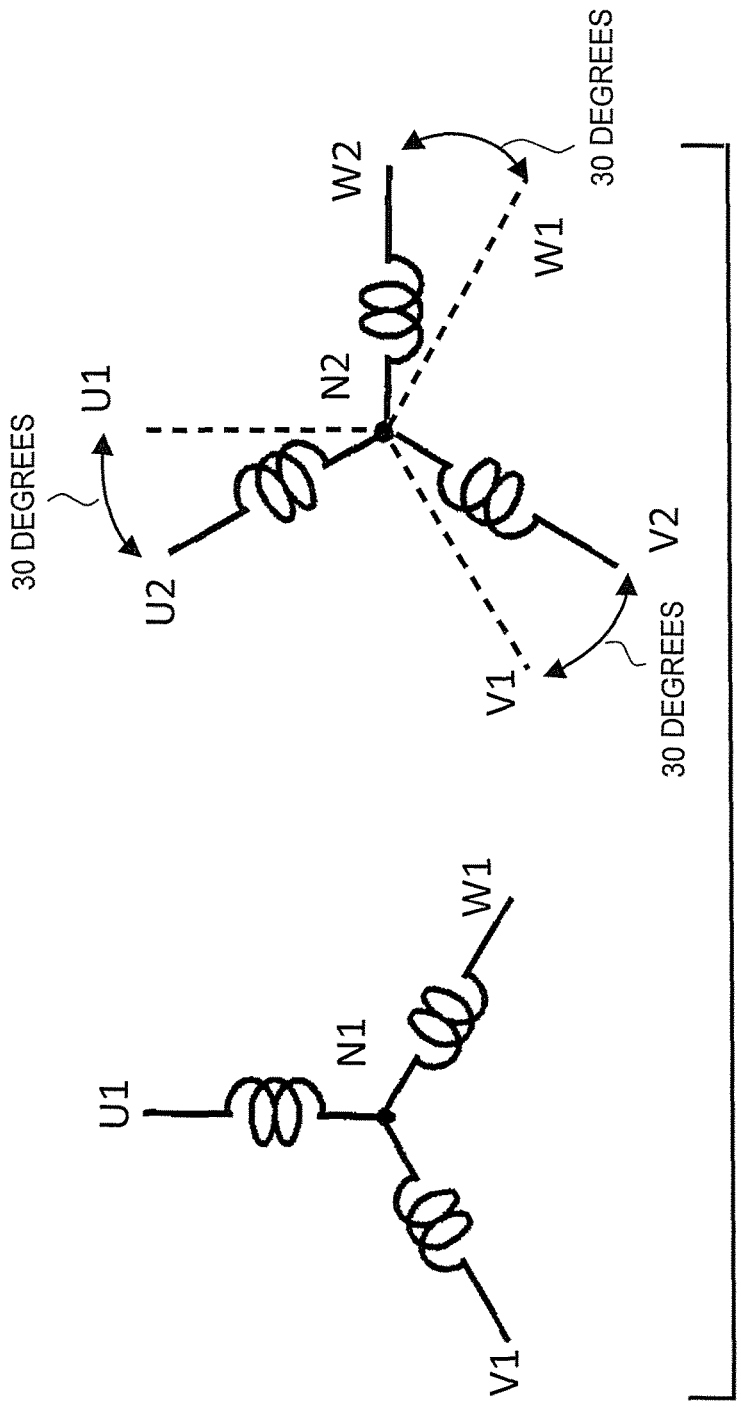
FIG. 27 is a diagram for illustrating an example of a stator winding of the AC rotating machine in the power conversion device according to the second embodiment of the present invention.
Figure 29:
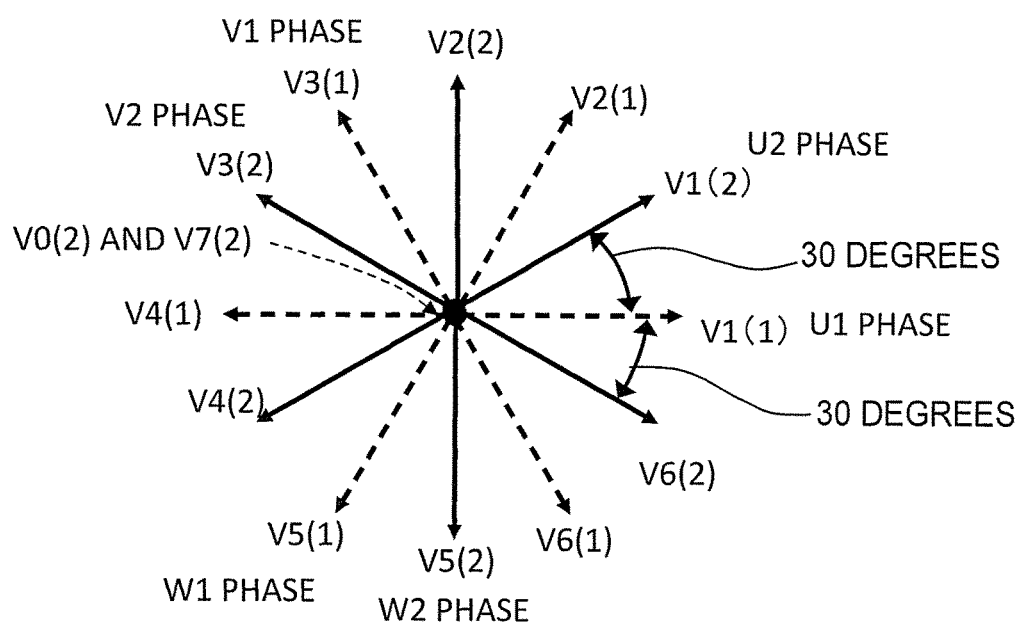
FIG. 29 is a diagram for illustrating an example of first and second voltage vectors in the power conversion device according to the second embodiment of the present invention.

A description is now given of the AC rotating machine 1a. The rotor structure is the same as that of FIG. 4. As illustrated in FIG. 27, the stator windings (C1 and C2) have the phase difference of 30 degrees in the electrical angle between the U1 winding and the U2 winding, between the V1 winding and the V2 winding, and between the W1 winding and the W2 winding. Regarding this phase difference, in FIG. 29, winding directions of the three-phase winding (C1) having the U1, V1, and W1 phases represented by the dotted lines are superimposed on winding directions of the second three-phase winding (C2) having the U2, V2, and W2 phases represented by the solid lines. In the following, for the sake of description, U1, V1, and W1 may be referred to as first three-phase windings, and U2, V2, and W2 may be referred to as second three-phase windings.

Figure 28:
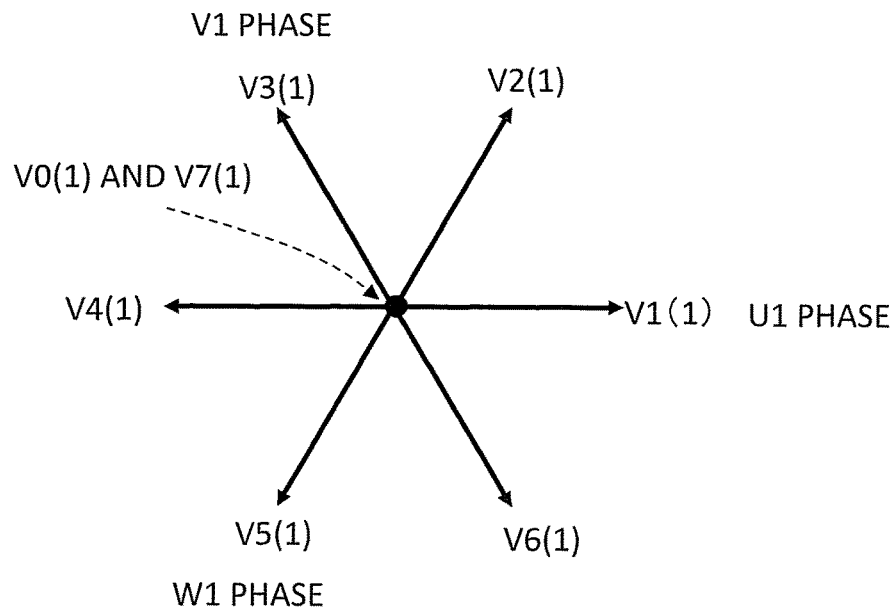
FIG. 28 is a diagram for illustrating an example of first voltage vectors in the power conversion device according to the second embodiment of the present invention.

A description is now given of a relationship between the first voltage vectors and the second voltage vectors according to the second embodiment. FIG. 28 is a diagram for illustrating the first voltage vectors, and is the same as that described in the first embodiment. Meanwhile, in FIG. 29, the second voltage vectors are represented by the solid lines, and the first voltage vectors are represented by the broken lines. The vectors V0(2) and V(2) are represented by the black dots at the origin. V0(1) and V7(1) similarly exist at the origin, but are omitted.

As described above, the AC rotating machine 1a according to the second embodiment has the phase difference of 30 degrees between the first three-phase winding C1 and the second three-phase winding C2. Thus, except for V0(1), V0(2), V7(1), and V7(2) having no magnitude, all of V1(1), with respect to V1(2) and V6(2),
V2(1), with respect to V1(2) and V2(2),
V3(1), with respect to V2(2) and V3(2),
V4(1), with respect to V3(2) and V4(2),
V5(1), with respect to V4(2) and V5(2), and
V6(1), with respect to V5(2) and V6(2)

have the phase difference in the electrical angle of 30 degrees.

FIG. 30 is a table for showing a relationship among the rotational position θ of the AC rotating machine 1a, the q axis phase θq (=θ+90 degrees), two first voltage vectors upon the detection of the first bus current Idc1, and two second voltage vectors upon the detection of the second bus current Idc2 according to the second embodiment. On this occasion, the reference phase (0 degrees) of θ and θq is the U1 phase direction. According to the second embodiment, the two first voltage vectors are determined upon the detection of the first bus current Idc1 and the two second voltage vectors are determined upon the detection of the second bus current Idc2 in accordance with the relationship of FIG. 30.

From FIG. 30, when θq is in a range of from 0 degrees to 30 degrees, four voltage vectors V1(1), V2(2), V1(2), and V2(2) illustrated in FIG. 26 are output. In other ranges of θq, two voltage vectors are similarly generated in accordance with FIG. 30. As a result, each pair of both of the two first voltage vectors and the two second voltage vectors are the two voltage vectors on both sides of the q axis. The respective values close to averages in the period Ts of the currents Iu1, Iv1, and Iw1 flowing through the first three-phase winding, and the currents Iu2, Iv2, and Iw2 flowing through the second three-phase winding by respectively detecting the first bus current Idc1 and the second bus current Idc2 when those voltage vectors are output.

In a case where the AC rotating machine 1a has a mutual inductance between the first three-phase winding C1 and the second three-phase winding C2, the d axis component thereof is denoted by Md, and the q axis component thereof is denoted by Mq, based on a relationship in the magnitude between Ld+Md and Lq+Mq, the following setting may be provided.

When a relationship Ld+Md<Lq+Mq holds true, the two first voltage vectors and the two second voltage vectors on both sides of the q axis are output.

On the other hand, when a relationship Ld+Md>Lq+Mq holds true, the two first voltage vectors and the two second voltage vectors on both sides of the d axis are output.

The inductance is set as a sum of the respective self-inductances of the first three-phase winding C1 and the second three-phase winding C2, and the mutual inductance between the first three-phase winding C1 and the second three-phase winding C2.

As in the first embodiment, the switching signal generation part 5a may be configured to output the two voltage vectors for bringing the mode to the power running mode upon the current detection in order to provide the effect of the decrease in the power loss in the power running operation state.

Further, as in the first embodiment, the switching signal generation part 5a may be configured to output the two voltage vectors for bringing the mode to the regeneration mode upon the current detection in order to provide the effect of the decrease in the power loss in the regeneration operation state.

Further, the operation in the power running operation state and the operation in the regeneration operation state may be combined to be carried out.

Yet further, it should be understood that the present invention can be applied to a device provided with an AC rotating machine including one or a plurality of multi-phase windings of four or more phases.

The present invention is not limited to the respective embodiments described above, and includes all possible combinations of the features of those embodiments.

INDUSTRIAL APPLICABILITY

The power conversion device, and the like, according to the present invention can be applied to a power conversion device, and the like, in various fields.

REFERENCE SIGNS LIST 1, 1a AC rotating machine, 2 DC power supply, 3 power conversion part, 3a first electric conversion part, 3b second electric conversion part, 5, 5a switching signal generation part, 6, 6a voltage command calculation part, 7 current detection part, 7a shunt resistor, 7b sample-and-hold device, 8 phase current calculation part, 8a first phase current calculation part, 8b second phase current calculation part, 10 first current detection part, 10a shunt resistor, 10b sample-and-hold device, 11 second current detection part, 11a shunt resistor, 11b sample-and-hold device, 41 to 44 permanent magnet, 100 position detector, C1 first three-phase winding (multi-phase winding), C2 second three-phase winding (multi-phase winding), PT power conversion unit

The invention claimed is:

1. A power conversion device, comprising:
an AC rotating machine having saliency, and including a multi-phase winding of three phases or more;
a DC power supply configured to output a DC voltage;
a voltage command calculation part configured to calculate voltage commands based on a control command from an outside for the AC rotating machine;
a switching signal generation part configured to output switching signals corresponding to at least two voltage vectors on both sides of an axis having a larger inductance out of d and q axes of the AC rotating machine, and corresponding to the voltage commands;
a power conversion part configured to carry out, based on the switching signals, one or both of an operation of converting the DC voltage from the DC power supply to an AC voltage and supplying the AC voltage to the AC rotating machine during a power running operation, and an operation of converting an electromotive force of the AC rotating machine to DC power and supplying the DC power to the DC power supply during a regeneration operation;
a current detection part configured to detect a bus current, which is a current flowing between the DC power supply and the power conversion part; and
a phase current calculation part configured to calculate, based on the detected bus current, a phase current flowing through the multi-phase winding of the AC rotating machine,
wherein the current detection part is configured to detect the bus current when the switching signals corresponding to the at least two voltage vectors are output.

2. The power conversion device according to claim 1, wherein the switching signal generation part is configured to output the switching signals corresponding to a voltage vector when a current is supplied from the DC power supply to the AC rotating machine at a timing at which the bus current is detected by the current detection part in a case where the AC rotating machine is in a power running operation state.

3. The power conversion device according to claim 2, wherein the switching signal generation part is configured to output the switching signals corresponding to a voltage vector when a current is supplied from the AC rotating machine to the DC power supply at a timing at which the bus current is detected by the current detection part in a case where the AC rotating machine is in a regeneration operation state.

4. The power conversion device according to claim 3, wherein the current detection part is configured to detect the bus current at a timing of the switching signals corresponding to the at least two voltage vectors on both sides of a voltage command vector when an amplitude of the voltage commands is more than a threshold.

5. The power conversion device according to claim 2, wherein the current detection part is configured to detect the bus current at a timing of the switching signals corresponding to the at least two voltage vectors on both sides of a voltage command vector when an amplitude of the voltage commands is more than a threshold.

6. The power conversion device according to claim 1, wherein the switching signal generation part is configured to output the switching signals corresponding to a voltage vector when a current is supplied from the AC rotating machine to the DC power supply at a timing at which the bus current is detected by the current detection part in a case where the AC rotating machine is in a regeneration operation state.

7. The power conversion device according to claim 6, wherein the current detection part is configured to detect the bus current at a timing of the switching signals corresponding to the at least two voltage vectors on both sides of a voltage command vector when an amplitude of the voltage commands is more than a threshold.

8. The power conversion device according to claim 1, wherein the current detection part is configured to detect the bus current at a timing of the switching signals corresponding to the at least two voltage vectors on both sides of a voltage command vector when an amplitude of the voltage commands is more than a threshold.

9. A control device for an electric power steering, comprising the power conversion device of claim 8 so that the AC rotating machine generates a torque for assisting a steering torque of a steering system.

10. A control device for an electric power steering, comprising the power conversion device of claim 1 so that the AC rotating machine generates a torque for assisting a steering torque of a steering system.

11. A power conversion device, comprising:
an AC rotating machine having saliency, and including a first multi-phase winding and a second multi-phase winding of three phases or more;
a DC power supply configured to output a DC voltage;
a voltage command calculation part for calculating first voltage commands and second voltage commands based on a control command from an outside for the AC rotating machine;
a switching signal generation part configured to output first switching signals corresponding to at least two first voltage vectors on both sides of an axis having a larger inductance out of d and q axes of the first multi-phase winding of the AC rotating machine, and corresponding to the first voltage commands, and to output second switching signals corresponding to at least two second voltage vectors on both sides of an axis having a larger inductance out of d and q axes of the second multi-phase winding of the AC rotating machine, and corresponding to the second voltage commands;
a first power conversion part configured to carry out, based on the first switching signals, one or both of an operation of converting the DC voltage from the DC power supply to an AC voltage and supplying the AC voltage to the first multi-phase winding of the AC rotating machine during a power running operation, and an operation of converting an electromotive force of the first multi-phase winding of the AC rotating machine to DC power and supplying the DC power to the DC power supply during a regeneration operation;
a second power conversion part configured to carry out, based on the second switching signals and in synchronization with the first power conversion part, one or both of an operation of converting the DC voltage from the DC power supply to an AC voltage and supplying the AC voltage to the second multi-phase winding of the AC rotating machine during the power running operation, and an operation of converting an electromotive force of the second multi-phase winding of the AC rotating machine to DC power and supplying the DC power to the DC power supply during the regeneration operation;
a first current detection part configured to detect a first bus current, which is a current flowing between the DC power supply and the first power conversion part;
a second current detection part configured to detect a second bus current, which is a current flowing between the DC power supply and the second power conversion part;
a first phase current calculation part configured to calculate, based on the detected first bus current, a phase current flowing through the first multi-phase winding of the AC rotating machine; and
a second phase current calculation part configured to calculate, based on the detected second bus current, a phase current flowing through the second multi-phase winding of the AC rotating machine, wherein:
the first current detection part is configured to detect the first bus current when the first switching signals corresponding to the at least two first voltage vectors are output; and
the second current detection part is configured to detect the second bus current when the second switching signals corresponding to the at least two second voltage vectors are output.

12. The power conversion device according to claim 11, wherein the inductance comprises a sum of respective self-inductances of the first multi-phase winding and the second multi-phase winding, and a mutual inductance between the first multi-phase winding and the second multi-phase winding.

13. The power conversion device according to claim 12, wherein the first switching signal generation part and the second switching signal generation part is configured to output the first switching signals and the second switching signals corresponding to a voltage vector respectively when a current is supplied from the DC power supply to the AC rotating machine at respective timings at which the first bus current and the second bus current are detected by the first current detection part and the second current detection part respectively in a case where the AC rotating machine is in a power running operation state.

14. The power conversion device according to claim 13, wherein the first switching signal generation part and the second switching signal generation part is configured to output the first switching signals and the second switching signals corresponding to a voltage vector respectively when a current is supplied from the AC rotating machine to the DC power supply at respective timings at which the first bus current and the second bus current are detected by the first current detection part and the second current detection part respectively in a case where the AC rotating machine is in a regeneration operation state.

15. The power conversion device according to claim 12, wherein the first switching signal generation part and the second switching signal generation part is configured to output the first switching signals and the second switching signals corresponding to a voltage vector respectively when a current is supplied from the AC rotating machine to the DC power supply at respective timings at which the first bus current and the second bus current are detected by the first current detection part and the second current detection part respectively in a case where the AC rotating machine is in a regeneration operation state.

16. The power conversion device according to claim 11, wherein the first switching signal generation part and the second switching signal generation part is configured to output the first switching signals and the second switching signals corresponding to a voltage vector respectively when a current is supplied from the DC power supply to the AC rotating machine at respective timings at which the first bus current and the second bus current are detected by the first current detection part and the second current detection part respectively in a case where the AC rotating machine is in a power running operation state.

17. The power conversion device according to claim 16, wherein the first switching signal generation part and the second switching signal generation part is configured to output the first switching signals and the second switching signals corresponding to a voltage vector respectively when a current is supplied from the AC rotating machine to the DC power supply at respective timings at which the first bus current and the second bus current are detected by the first current detection part and the second current detection part respectively in a case where the AC rotating machine is in a regeneration operation state.

18. The power conversion device according to claim 11, wherein the first switching signal generation part and the second switching signal generation part is configured to output the first switching signals and the second switching signals corresponding to a voltage vector respectively when a current is supplied from the AC rotating machine to the DC power supply at respective timings at which the first bus current and the second bus current are detected by the first current detection part and the second current detection part respectively in a case where the AC rotating machine is in a regeneration operation state.

19. The power conversion device according to claim 11, wherein the first current detection part and the second current detection part are configured to detect the first bus current and the second bus current respectively at respective timings of the first switching signal and the second switching signal corresponding to the at least two voltage vectors on both sides of a voltage command vector when an amplitude of the voltage commands is more than a threshold.

20. A control method for a power conversion device, comprising:
calculating, by a voltage command calculation part, voltage commands based on a control command from an outside for an AC rotating machine having saliency, and including a multi-phase winding of three phases or more;
outputting, by a switching signal generation part, switching signals corresponding to at least two voltage vectors on both sides of an axis having a larger inductance out of d and q axes of the AC rotating machine, and corresponding to the voltage commands;
carrying out, by a power conversion part, based on the switching signals, one or both of converting a DC voltage from a DC power supply to an AC voltage and supplying the AC voltage to the AC rotating machine during a power running operation, and converting an electromotive force of the AC rotating machine to DC power and supplying the DC power to the DC power supply during a regeneration operation;
detecting, by a current detection part, a bus current, which is a current flowing between the DC power supply and the power conversion part;
calculating, by a phase current calculation part, based on the bus current, a phase current flowing through the multi-phase winding of the AC rotating machine; and
detecting, by the current detection part, the bus current when the switching signals corresponding to the at least two voltage vectors are output.

* * * * *